(12) United States Patent
Evans et al.

(10) Patent No.: US 9,514,236 B2
(45) Date of Patent: Dec. 6, 2016

(54) RECOMMENDATION NETWORK

(75) Inventors: Matthew R. Evans, Draper, UT (US);
Daniel L. Salgado, Fremont, CA (US)

(73) Assignee: RESOURCE CONSORTIUM LIMITED (VG)

( * ) Notice: Subject to any disclaimer, the term of this patent is extended or adjusted under 35 U.S.C. 154(b) by 402 days.

(21) Appl. No.: 13/373,501

(22) Filed: Nov. 15, 2011

(65) Prior Publication Data
US 2012/0221505 A1 Aug. 30, 2012

Related U.S. Application Data

(63) Continuation-in-part of application No. 12/802,482, filed on Jun. 7, 2010, now Pat. No. 8,090,673, which is a continuation of application No. 11/507,699, filed on Aug. 21, 2006, now Pat. No. 7,761,399.

(60) Provisional application No. 60/709,623, filed on Aug. 19, 2005.

(51) Int. Cl.
*G06Q 10/10* (2012.01)
*G06F 17/30* (2006.01)

(52) U.S. Cl.
CPC ........... *G06F 17/3089* (2013.01); *G06Q 10/10* (2013.01)

(58) Field of Classification Search
CPC .......... G06N 5/02; G06N 5/04; G06N 99/005; G06F 17/2785; G06Q 10/10
USPC ........................................ 706/55, 46, 45, 62
See application file for complete search history.

(56) References Cited

U.S. PATENT DOCUMENTS

| 6,266,667 B1* | 7/2001 | Olsson |
| 6,892,178 B1* | 5/2005 | Zacharia ...................... 705/7.29 |
| 7,222,078 B2* | 5/2007 | Abelow ........................ 705/1.1 |
| 7,664,669 B1* | 2/2010 | Adams et al. ............... 705/7.32 |

(Continued)

OTHER PUBLICATIONS

Wang et al, "Effective personalized recommendation based on time-framed navigation clustering and association mining", Expert Systems with Applications 27 (2004) 365-377, teaches personalized recommendation.*

(Continued)

*Primary Examiner* — Stanley K Hill
*Assistant Examiner* — Ilya Traktovenko
(74) *Attorney, Agent, or Firm* — The Belles Group, P.C.

(57) ABSTRACT

A recommendation network is described. In some embodiments, the recommendation network includes recommenders that explicitly or implicitly recommend, rate or refer items and recommendation receivers that receive the recommendations. In some embodiments, the recommenders can be recommendation receivers, and vice versa. In some embodiments, recommendation receivers assign rust ratings to recommenders. The recommendation receiver can assign separate trust ratings to individual topics for which the recommendation receiver trusts the recommender. The separate trust ratings represent the recommendation receiver's amount of trust in the recommender to makes valuable recommendations for the specific topic. The recommendation network can use the separate trust ratings, along with ratings provided by the recommender, to rank recommendations per the separate topics. The recommendation receiver can assign the recommender to different bundles, topics, channels, etc. to which other recommendation receivers can subscribe.

15 Claims, 16 Drawing Sheets

(56) References Cited

U.S. PATENT DOCUMENTS

| | | | | |
|---|---|---|---|---|
| 7,761,399 | B2 | 7/2010 | Evans | |
| 8,554,601 | B1* | 10/2013 | Marsh et al. | 705/7.32 |
| 8,621,215 | B1* | 12/2013 | Iyer | 713/169 |
| 2003/0037041 | A1* | 2/2003 | Hertz | 707/1 |
| 2003/0055898 | A1* | 3/2003 | Yeager et al. | 709/205 |
| 2003/0090513 | A1* | 5/2003 | Ramakrishnan | 345/744 |
| 2004/0088646 | A1* | 5/2004 | Yeager et al. | 715/500 |
| 2005/0060647 | A1* | 3/2005 | Doan et al. | 715/514 |
| 2005/0246420 | A1* | 11/2005 | Little, II | 709/204 |
| 2005/0256866 | A1 | 11/2005 | Lu et al. | |
| 2006/0230461 | A1* | 10/2006 | Hauser | 726/27 |

OTHER PUBLICATIONS

Ziegler et al, "Improving Recommendation Lists Through Topic Diversification", WWW 2005, May 1014, 2005, Chiba, Japan, teaches topic diversification.*

Ziegler et al, "Analyzing Correlation between Trust and User Similarity in Online Communities", iTrust 2004, LNCS 2995, pp. 251-265, 2004, Springer-Verlag Berlin Heidelberg 2004, teaches trust and user similarity.*

Massa et al, "Trust-Aware Collaborative Filtering for Recommender Systems", LNCS 3290, pp. 492-508, 2004, Springer-Verlag Berlin Heidelberg 2004, teaches trust aware recommending.*

Massa et al, "Using Trust in Recommender Systems: An Experimental Analysis", iTrust 2004, LNCS 2995, pp. 221-235, 2004, Springer-Verlag Berlin Heidelberg 2004, teaches trust aware recommending.*

O'Donovan, J. et al., Trust in Recommender Systems, in IUI '05: Proceedings of the 10th international conference on intelligent user interfaces, 2005 p. 167-174. ACM Press.

Massa, P. et al., Trust-aware Collaborative Filtering for Recommender Systems, LNCS 3290, pp. 492-508, 2004.

Zeigler et al. "Improving Recommendation Lists Through Topic Diversification," WWW May 10-14, 2005, pp. 22-32.

Wang et al. "Effective personalized recommendation system based on time-framed navigation clustering and association mining" Expert Systems w/ Applications 27(2004),pp. 365-377.

"U.S. Appl. No. 11/507,699, Notice of Allowance", Mar. 9, 2010, 36 pages.

"U.S. Appl. No. 11/507,699, Office Action", Jul. 27, 2009, 21 pages.

"U.S. Appl. No. 12/802,482, Notice of Allowance," Aug. 15, 2011, 5 pages.

"U.S. Appl. No. 12/802,482, Office Action," Nov. 29, 2010, 8 pages.

* cited by examiner

| BUNDLE | CONTENT | LEVEL 1 RATINGS | LEVEL 2 RATINGS | |
|---|---|---|---|---|
| 148 | 101 | -2 | +4 | +2 |
|  | 105 | +3 | +6 | +10 |
| 149 | 105 | +3 | +6 | |
|  | 106 | +1 | +6 | |

FIG. 5

RECOMMENDATION NETWORK

RELATED APPLICATIONS

This application claims priority of U.S. patent application Ser. No. 12/802,482 filed Jun. 7, 2010, which claims priority benefit of U.S. patent application Ser. No. 11/507,699, filed Aug. 21, 2006, which claims priority benefit of U.S. Provisional Patent Application No. 60/709,623, which applications are hereby incorporated by reference.

FIELD

The present invention relates generally to the field of networks and software and, more specifically, to methods and apparatus to make recommendations on a network.

BACKGROUND

Today there are many types of networks available, each with its own set of benefits and drawbacks. One major drawback of networks today is apparent when users of the network attempt to find relevant information on the network, especially given that some networks, such as the Internet, contain countless pieces of information that may or may not be relevant to the user. There is just so much information that the user finds it very difficult to sort through it all.

Some methods have been developed to assign value to information on a network to assist in finding relevant information. One method is a social network. In a social network, a first user of the network may make a recommendation regarding information, but only other users who have a personal knowledge of the first user have a pre-determined basis for considering the recommendation to be valuable or noteworthy based on the trust that they have in that person. All other users who have no personal knowledge of the first user have no basis for determining if the recommendation is valuable, or noteworthy. Therefore, those other users must spend the time to view the content, or simply ignore the recommendation before they can determine if it is valuable or noteworthy.

Furthermore, even those who have a personal knowledge of, and trust in, the first user still have a difficult time sifting through all of the recommendations from just their trusted friends and family, especially since the trusted friends and family may not necessarily be an expert judge of good content. Hence, there may be much better content beyond what is recommended by the circle of trust, but no way to really find it.

SUMMARY

A recommendation network is described. The recommendation network may include, but is not limited to, users or entities ("recommendation sources,") that explicitly or implicitly recommend, rate or refer items ("item" being anything that can be recommended, rated or referred, such as content, information, products, entities) and users or entities that receive recommendations or referrals ("recommendation receivers,"). Users who make recommendations can create multiple recommendation sources, using different recommendation sources for different purposes, by assigning different recommendations to different recommendation sources.

The recommendation network allows recommendation receiver to assign relative trust ratings to recommendation sources, the relative trust rating representing the recommendation receiver's confidence that the recommendation source, compared to other recommendation sources, makes recommendations the recommendation receiver considers valuable. The relative trust ratings can be ordinal or cardinal values that can be used by the network algorithm to filter and rank items for the recommendation receiver. The network ranks items for the recommendation receiver based on the number of recommendation source referencing the item and the relative trust rating the recommendation receiver has assigned to those recommendation sources.

By ranking items for each recommendation receiver according to the a ranking algorithm that uses the relative trust ratings the recommendation receiver has assigned to those recommendation source, the network allows the recommendation receiver to receive recommendations for items in the form of a ranked list, the items being ranked by the degree they are recommended by the recommendation receiver's trusted recommendation sources.

By allowing the recommendation receiver to assign relative trust ratings to different recommendation source, and by ranking and displaying recommendations by the degree to which they are recommended to the recommendation receiver, the network allows users to subscribe to, or receive, recommendations from a limitless number of recommendation sources without being overwhelmed. The network prioritizes the recommendations for a recommendation receiver by the parameters the recommendation receiver establishes, imposing order on a potentially-limitless number of pushed recommendations.

According to an embodiment of the invention, a recommendation receiver can be a recommendation source, and can create recommendation sources, for themselves or other recommendation receivers. The recommendation receiver may explicitly or implicitly recommend items as a recommendation source, and can also recommend other recommendation sources, or re-label other recommendation sources, or rate multiple recommendation sources and combine them, to create new recommendation sources. Besides combining multiple recommendation sources to create a new recommendation source, recommendation receivers can create new recommendation sources by restricting the new recommendation source to include only those recommendations, from one or more existing recommendation sources, that share or avoid particular characteristics. Thus, the recommendation receiver can interpret, or reinterpret, the recommendation source in their own way, which may be to explain, expound or elaborate on, editorialize about, clarify, recommend, label, combine, split-up and recombine in different ways, refine, organize, categorize, group, or in any other way use or interpret the recommendation source to create new recommendation sources that are meaningful to the recommendation receiver. The new recommendation sources may in turn be used by the recommendation receiver, or other recommendation receivers. Other recommendation receivers can assign relative trust values to the new recommendation sources. Therefore, by interpreting or reinterpreting received recommendation sources to create new recommendation sources, then by recommending those new recommendation sources, the recommendation receiver provides more information, which helps other recommendation receivers to identify valuable recommendations and information about items.

Other features, according to other embodiments of the present invention, will be apparent from the accompanying drawings and from the detailed description that follows.

BRIEF DESCRIPTION OF THE DRAWINGS

Embodiments of the present invention are illustrated by way of example and should not be limited by the figures ("FIG.") of the accompanying drawings in which like references indicate similar elements and in which:

FIG. 5 is a diagram of a recommendation network 500, configured according to an embodiment of the present invention.

DETAILED DESCRIPTION

Figure 1:
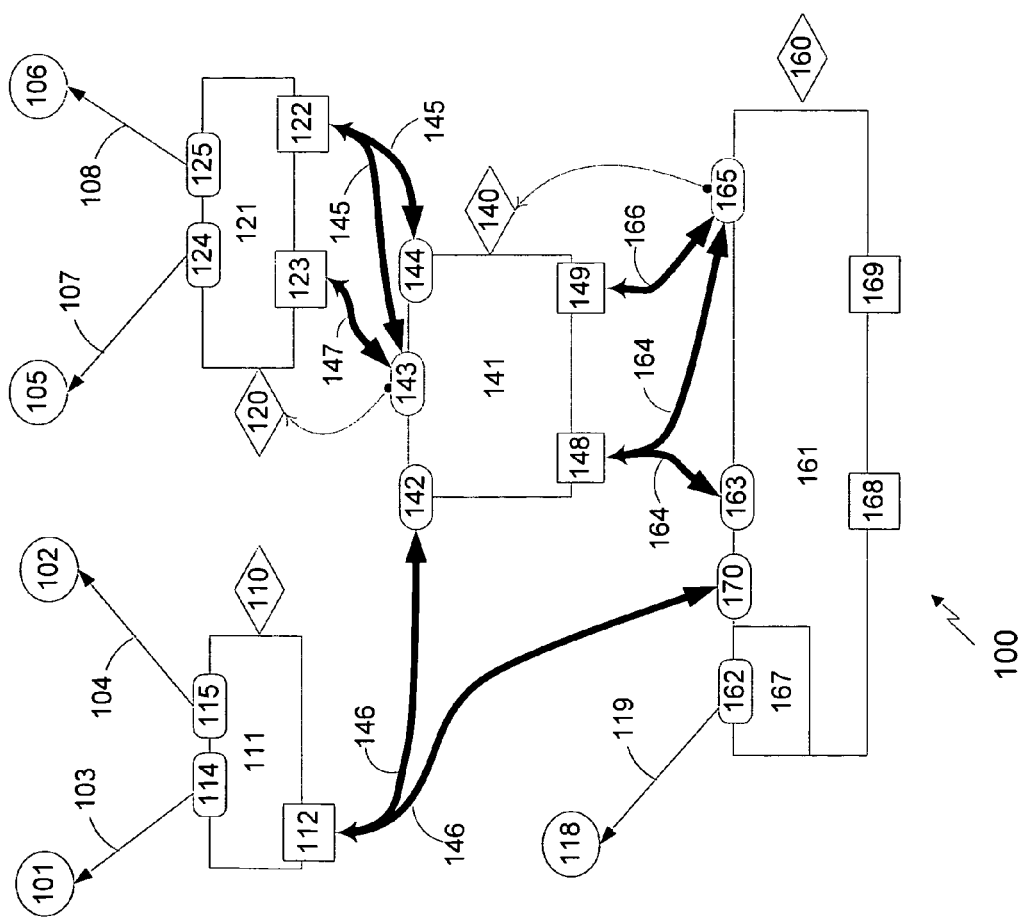
FIG. 1 is a diagram of a recommendation network 100, configured according to an embodiment of the present invention.

Described herein is a recommendation network. In the following description numerous specific details are set forth. One of ordinary skill in the art, however, will appreciate that these specific details are not necessary to practice embodiments of the invention. While certain exemplary embodiments of the invention are described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

Some portions of the detailed descriptions that follow may be presented in terms of algorithms and symbolic representations of operations on data bits within a computer memory. These algorithmic descriptions and representations are the means used by those ordinarily skilled in the data processing arts to most effectively convey the substance of their work to others ordinarily skilled in the art. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments may relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium. A computer readable storage medium includes any mechanism that stores information in a form readable by a machine. For example, computer readable storage media includes read only memory (ROM), random access memory (RAM), magnetic disk storage media, optical storage media (e.g., CD-ROM), flash memory machines, erasable programmable memory (e.g., EPROM and EEPROM); etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a computer readable storage medium having stored thereon instructions, which may be used to program a computer system to perform a process according to embodiments(s), whether presently described or not, because every conceivable variation is not enumerated herein.

The algorithms and displays presented herein are not inherently related to any particular computer or other apparatus. Various general-purpose systems may be used with programs in accordance with the teachings herein, or it may prove convenient to construct more specialized apparatus to perform the required methods. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A recommendation network is described. The recommendation network may include, but is not limited to, users or entities ("recommendation sources,") that explicitly or implicitly recommend, rate or refer items ("item" being anything that can be recommended, rated or referred, such as content, information, products, entities) and users or entities that receive recommendations or referrals ("recommendation receivers,"). Users who make recommendations can create multiple recommendation sources, using different recommendation sources for different purposes, by assigning different recommendations to different recommendation sources.

The recommendation network allows recommendation receiver to assign relative trust ratings to recommendation sources, the relative trust rating representing the recommendation receiver's confidence that the recommendation source, compared to other recommendation sources, makes recommendations the recommendation receiver considers valuable. The relative trust ratings can be ordinal or cardinal values that can be used by the network algorithm to filter and rank items for the recommendation receiver. The network ranks items for the recommendation receiver based on the number of recommendation source referencing the item and the relative trust rating the recommendation receiver has assigned to those recommendation sources.

By ranking items for each recommendation receiver according to the number of recommendation source making the recommendation and the relative trust ratings the recommendation receiver has assigned to those recommendation source, the network allows the recommendation receiver to receive recommendations for items in the form of a ranked list, the items being ranked by the degree they are recommended by the recommendation receiver's trusted recommendation sources.

By allowing the recommendation receiver to assign relative trust ratings to different recommendation source, and by ranking and displaying recommendations by the degree to which they are recommended to the recommendation receiver, the network allows users to subscribe to limitless recommendation source without being overwhelmed. The network prioritizes the recommendations for an recommendation receiver by the parameters the recommendation receiver establishes, imposing order on a potentially-limitless number of pushed recommendations.

According to an embodiment of the invention, a recommendation receiver can be a recommendation source, and can create recommendation sources, for themselves or other recommendation receivers. The recommendation receiver may explicitly or implicitly recommend items as a recommendation source, and can also recommend other recommendation sources, or re-label other recommendation sources, or rate multiple recommendation sources and combine them, to create new recommendation sources. Besides combining multiple recommendation sources to create a new recommendation source, recommendation receivers can create new recommendation sources by restricting the new recommendation source to include only those recommendations, from one or more existing recommendation sources, that share or avoid particular characteristics. Thus, the recommendation receiver can interpret, or reinterpret, the recommendation source in their own way, which may be to explain, expound or elaborate on, editorialize about, clarify, recommend, label, combine, split-up and recombine in different ways, refine, organize, categorize, group, or in any other way use or interpret the recommendation source to create new recommendation sources that are meaningful to the recommendation receiver. The new recommendation sources may in turn be used by the recommendation receiver, or other recommendation receivers. Other recommendation receivers can assign relative trust values to the new recommendation sources. Therefore, by interpreting or reinterpreting received recommendation sources to create new recommendation sources, then by recommending those new recommendation sources, the recommendation receiver provides more information, which helps other recommendation receivers to identify valuable recommendations and information about items.

Herein, an entity or users may be referred to at some times as a recommendation source, at other times a recommender entity or recommender, and at other times as a recommendation receiver, and yet at other times as a bundler. This is because the same entity or user may function in all of those capacities. For example, the context may dictate a functional descriptor indicating that the user is capable of making a recommendation, and therefore may be called a "recommender". However, the sole term "recommender", in those contexts, should not preclude the capability of that user to receive recommendations as well, although a receiver user does not have to be a recommender user. Likewise, a user may be referred to solely as a recommendation "receiver" instead of a recommender, as the context may dictate a functional descriptor indicating that the user is capable of receiving a recommendation, or is to be utilized to receive a recommendation. However, the sole term "receiver", in those contexts, should not preclude the capability of that user to make recommendations as well, although a recommender user or entity does not have to be a receiver of recommendations. Furthermore, the recommendations sources, recommenders and recommender receivers may be described in conjunction with a device. However, it should be kept in mind that the entity or user and the device can function either in conjunction as a unit, or separately. Also, the user, or the device, can function either at similar times or at differing times.

FIG. 1 illustrates a recommendation network 100 according to an embodiment of the invention. The recommendation network 100 may be a computer network, either public, private, or any combination thereof, such as the Internet, a company or government intranet, or any a privately developed computer network. However, embodiments of the invention should not be restricted only to computer networks, as other embodiments of networks may pertain to other embodiments of the invention, including television networks, radio networks, or any other form of network where items may be referred or recommended. Referring to FIG. 1, the recommendation network 100 may include a recommendation source, such as a recommender entity ("recommender") 110. Recommender 110 may be any user or entity capable of making or conveying a recommendation or referral of "items". Items may be anything that can be recommended, rated or referred, such as content, information, products, entities, etc. In FIG. 1, some items are illustrated as content on the network 100, including content 101, 102, 105, 106, and 118. Furthermore, the recommender 110 can be an actual person, a group of people, or a device, such as a computer that can produce a recommendation.

Content 101, 102, 105, 106 and 118 may be any information that is available for access on a network. In one embodiment of the invention, the content 102 may be virtual or electronic content accessible by a computer through a computer network. For example, the content 102 may be web-page, a media file, a database, streaming data, an audio or video file, an RSS feed, metadata or any other object or data that can be stored in an electronic format, on a computer memory, or accessible through a computerized network. The content 102 may be a reference to a real life object, expressed on the network in an electronic format, such as a real estate or business listing, a notice of an upcoming social event, a critique of a public figure, etc. On the other hand, the content 102 may be a real-life (non-virtual, non-electronic) object, external to a computer network. For example, the content may be an actual place of business, an actual social gathering, an actual person, or other real-life object, that the recommender 110 recommends.

The recommender 110 may utilize a device 111 to make recommendations 103, 104 of one or more items, such as content 101 and 102 respectively. The recommendations 103, 104 may be explicit, or a direct, recommendation where the recommender is directly recommending the content for a particular topic. However, as will be shown later, the recommendations 103, 104 may be reinterpreted by a recommendation receiver (e.g., 140), who may assign the recommendations to a different topic, or somehow re-label or reorganize the recommendations to be understood or appreciated in a different light, from the perspective of the recommendation receiver 140, and re-recommended by the recommendation receiver 140. Thus, any recommendations 103, 104 from the recommender 110 may end up being implicit recommendations, or indirect recommendations, that have been re-cast by the recommendation receiver 140 as direct recommendations. In yet another embodiment of the invention, the recommendations 103, 104 can be a computational result derived through a plurality of criteria, data inputs, or formulaic variables set by the recommender 110, such as a web survey, a sports poll, or a rating system.

The recommendations 103, 104 may be combined, organized, or categorized into a recommendation source called a channel 112, or in other words a conglomeration of one or more recommendations. In one embodiment of the invention, the channel 112 may be labeled with, or assigned to, a topic to which the recommender 110 feels that content 101 and 102 are related. Consequently, in one embodiment of the invention, the channel 112 may be referred to as a topic channel. Furthermore, the recommender 110, may assign one or more recommendation value ratings 114, 115, to the content 101, 102 respectively, to characterize and quantify the degree of that the recommender 110 actually recommends the individual content 101, 102. These recommendation value ratings 114, 115 may be numbers (e.g., −10 to 10), descriptive ranks or weights (good to bad, best to worst, great to un-desirable, etc.), or any other measurement that express a range of like or dislike.

Considering that there are vast amounts of content in a network, the recommendation receiver 140 would have no practical way of accessing them all to determine their value. Conventional methods of querying data sources over a network have come up with some ways of analyzing the value of content, such as formulaic based search engines that run algorithms that objectively sort through data based on simple numeric variables. These variables have no particular value to the recommendation receiver 140, but have been determined through a process that may not even consider the recommendation receiver's 140 values, trust, or experiences. This shortcoming of conventional query or analysis methods of content on a network are overcome through the recommendation network described herein.

According to conventional networks, and their known query and ranking methods, an algorithm could be applied that would look at how many referring sources exist for content. However, according to embodiments of the invention, a new result can be determined based on an algorithm that calculates the number of bundles that include the content, as well as the ratings and scores produced by the recommendation network, to produce a far more valuable result.

The rating values may be processed by algorithms that can manipulate all of the ratings provided to it by a rating entity, and return a result. The algorithms and rating values may be utilized by rating entities within the network, or even by other users, whether inside or outside the network, that are interested in receiving a result based on the trust values within the network. Those other users may not be active participants in rating or recommending, but they may still greatly benefit from the usefulness of the recommendation network. In one embodiment of the invention, the result may be a ranking of content based on a topic, or key term, submitted or stored in a query, wherein the various values of trust afforded to the recommending entities (e.g., the primary recommenders or the intermediary recommenders) can be utilized to produce the ranking. Some algorithms may be expressed herein, but it should be appreciated that there are various ways of calculating, storing, processing, or in any other way utilizing the trust values within the recommendation network. Hence, embodiments of the invention should not be limited solely to the algorithms described herein.

The recommendation receiver entity (recommendation receiver 140) may receive the recommendations in the topic channel 112 via a communication 146, also referred to as a recommendation communication or a channel communication herein. This may be a communication in one of many forms, in a push or pull fashion, or via a variety of transmission mediums. In one embodiment of the invention, it may be a website object that has a variety of interne hypertext links to the content 101, 102. The recommendation receiver 140 may utilize a device 141 to receive the communication 146.

The recommendation receiver 140 may also assign a trust rating, or weight, to the recommender 110 that provides the topic channel 112. In one embodiment of the invention, the receiver 140 may have some personal knowledge of the recommender 110, and hence may have a basis in experience to trust that the recommender 110 may provide a noteworthy or valuable recommendation. However, in other embodiments of the invention, the receiver 140 may have not a personal knowledge of the recommender 110, but may still have some basis for assigning a trust rating, such as knowledge of the recommender's 110 credentials or reputation for making valuable recommendations. The trust rating 142 is a "relative" trust rating since it represents the degree of confidence that the recommendation receiver's 140 has that the recommendation source 110, relative to other recommendation sources, can make a recommendation that the recommendation receiver 140 considers noteworthy, important, interesting, or valuable. The relative trust rating 142 may be changed at any time as relative trust grows or diminishes in the recommender 110. This relative trust ratings may be based on subjective criteria, such as attributes, characteristics, or credentials of recommender 110. The trust ratings may be characterized by a quantifiable rating scale because rating entities may have varying levels of trust in the rated entities within the network. The values on the rating scale, therefore, could represent the varying levels of trust. This can be especially beneficial to the network because it can allow the rating entities to express a wide range of trust, which is truer to life, and which, ultimately, allows for a much more profound and reliable method for ranking content. One should keep in mind, however, that rating scales are varied, and any number of different rating scales may be applied to embodiments of the invention. Therefore, embodiments of the invention should not be limited to only rating scales described herein. A rating scale, as described herein, therefore, may include more than one degree of trust. For example, one rating scale may be a binary rating scale, indicating both a "high" trust and a "low trust" value, or even a "trust" and a "non-trust" value. Other ratings scales may include multiple values, such as a numerical rating scale, which may include numerical values ranging from one ("1") to ten ("10"), one ("1") being the lowest value and ten ("10") being the highest value. Other rating scales may take into consideration negative numbers or any number of complex variables. For example, a scale of negative ten ("−10") to a value of positive ten ("10"). The negative values could represent levels of distrust, or degrees to which the rating entities may resist, disvalue, or disapprove of a recommender and their recommendations. The relative trust rating may also be a descriptive rank or weights (high to low, great to little, etc.), or any other measurement that express a range of trust.

In one embodiment of the invention, the recommendation receiver 140 may assign different levels of trust to the recommender 110 regarding different topics (e.g., I trust the recommender's political recommendations, but not his religious recommendations). For example, the recommendation receiver may specifically assign the relative trust value 142 a degree that the recommendation receiver 140 actually trusts the recommender 110 on the specific topic of the topic channel 112.

The relative trust rating 142, as well as the previously mentioned recommendation value ratings 114, 115 can be values that can be stored in electronic memory, processed by one or more computer devices, and used by a network algorithm to filter, sort and rank content 101, 102 for the recommendation receiver 140, or for other network users.

As shown in FIG. 1, the recommendation receiver 140 may receive recommendations from a plurality of recommenders, not just recommender 110. Recommendation receiver 140 is shown as receiving additional recommendations 107, 108 of content 105, 106 from recommender 120. Recommender 120 may have recommended content 105, 106, assigned recommendation value ratings 124, 125, and also assigned the recommendations 107, 108 to one or more topic channels, 123, 122, in a similar fashion as recommender 110. Similarly, the recommendation receiver may receive the channel communications 145, 147 in a similar fashion as communication 146 was received. Furthermore, the recommendation receiver 140 may also assign relative trust ratings 143, 144 to recommender 120 pertaining to each of the individual topic channels 123, 122.

Figure 2:
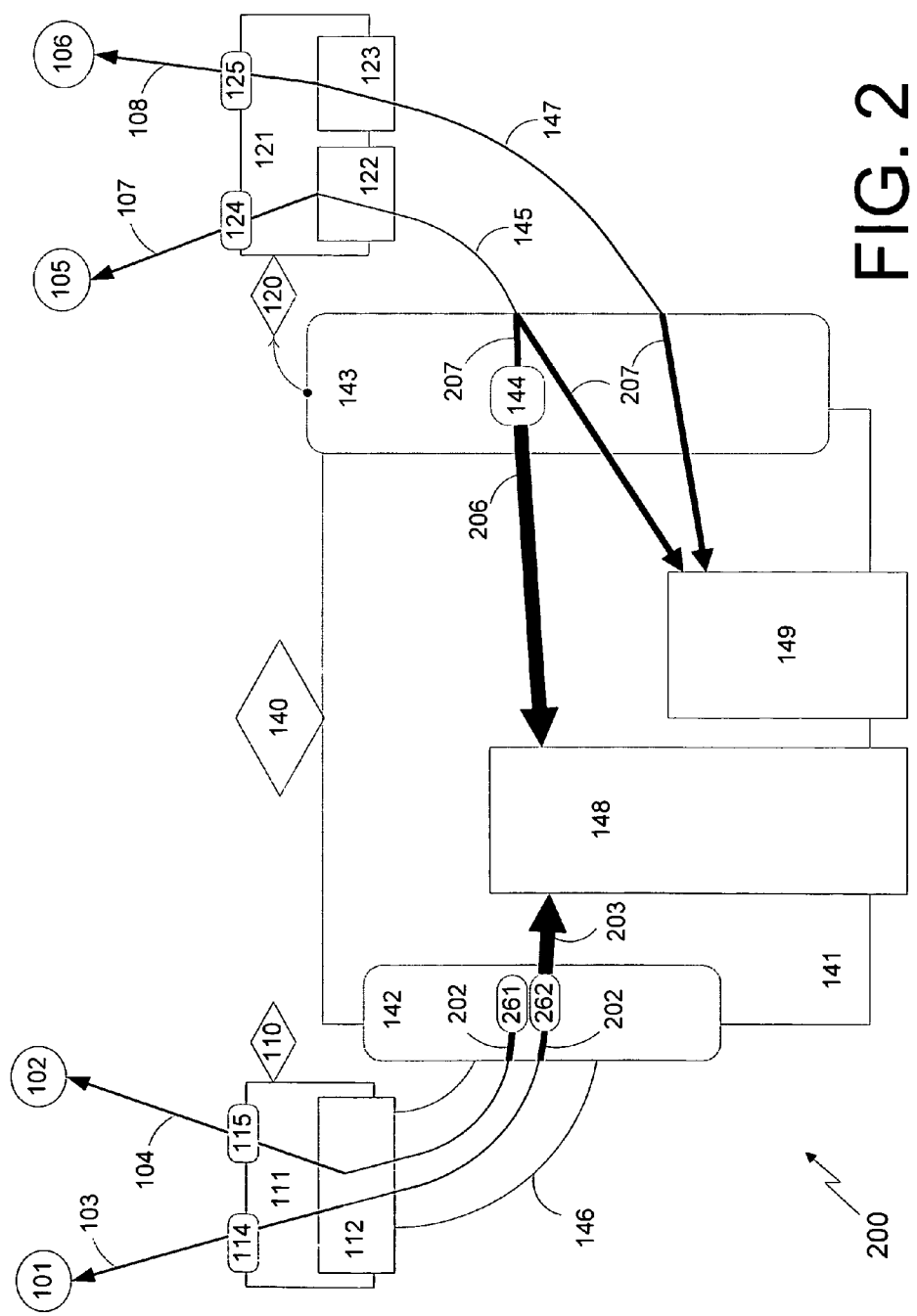
FIG. 2 is a diagram of a recommendation network 200, configured according to an embodiment of the present invention.

The recommendation receiver 140 may organize the topic channels 112, 123, 122, into labeled "bundles". FIG. 2, described further below, demonstrates one embodiment of the invention to create a bundle. Still referring to FIG. 1, however, the recommendation receiver can create the recommendation bundles 148, 149, using device 141. The recommendation bundles 148, 149 are recommendation sources as well. Specifically, the bundles are also channels, or more specifically are conglomeration of recommendation sources, such as the topic channels 112, 123, 122. However, the recommendation bundles 148, 149 may contain more information and functionality than the topic channel 112, 122, 123. The recommendation bundles 148, 149 may actually contain a plurality of channels bundled together. Information regarding the channels can be added and stored in the bundle, such as the relative trust ratings 142, 143, 144. The bundles may also contain a ranked list, or data to create a ranked list, of the content 101, 102, 105, 106 that are recommended via topic channels 112, 123, 122.

Since the recommendation receiver 140 may produce recommendation sources in the form of bundles 148, 149, the recommendation receiver 140 may also be termed a recommender. In the specific embodiment shown in FIG. 1, the receiver 140 may be considered a bundle recommender, a bundle provider, or more succinctly, a "bundler", who can provide bundles to subsequent receivers, such as recommendation receiver 160.

Recommendation receiver 160 may utilize a device 161, similar to devices 111, 121, 141, to receive any one of the bundles 148, 149 that are provided by receiver 140, to receive the topic channel 112 from recommender 110, or to create additional topic channels 167 and bundles 168, 169. The bundles 148, 149 may be transmitted via channel communications 164, 166, in a push or pull fashion. The receiver 160 may rate the recommendation receiver 140 regarding the bundles 148, 149, with trust ratings 163, 164 respectively, representing relative trust values that the receiver 160 has in the recommendation receiver (now a recommender or bundler) 140 to provide valuable recommendations, or in this case to provide valuable bundles that may contain valuable recommendations.

The recommendation receiver 160, just like the recommenders 110, 120, may also make recommendations, such as recommendation 119 of content 118. The recommendation receiver 160 may also assign recommendation value ratings 162 and create channels, such as a topic channel 167, and assign recommendations, like 119, to the topic channel 167. Similar to receiver 140, the recommendation receiver 160 may also create bundles 168, 169, and assign channels (topic channels and other bundles) to those bundles 168, 169.

Referring still to FIG. 1, devices 111, 121, 141, 161, in one embodiment of the invention, may be an electronic device, such as a transceiver, a desktop computer, a laptop computer, a Personal Digital Assistant (PDA), a BlackBerry™ Device, a cell phone, a telephone, etc. In another embodiment of the invention, the devices 111, 121, 141, 161, may be a storage medium, either electronic, or capable of being read by an electronic device, such as a computer memory, a hard disk, a compact disk, a magnetic disk, a flash drive, a video or audio tape or file, a cassette tape, etc. On the other hand, other embodiments of the invention are not limited to electronic devices or storage mediums, and the devices 111, 121, 141, 161, may be a representation of a non-electronic medium. Each of the devices 111, 121, 141, 161, do not all have to be the same device, but rather can be any combination of those listed above, or any other communication device that would be known to one skilled in the art, to effectuate the embodiments of the invention described herein.

Furthermore, still referring to FIG. 1, recommendations 103, 104, 107, 108, 119 can take many different forms, such as a web link, an RSS feed, a web posting, an email, a data stream, or any other electronic format that is storable or transmittable through a network. They can be processed, or transmitted in real-time, or near real time.

It should be noted that although the recommendations 103, 104, 107, 108, 119 are shown as having recommendation value ratings 114, 115, 124, 125, 162, not all content has to be rated by a recommender to be included in the recommendation network 100.

The bundles 148, 149, 168, 169, may be considered packages, or containers for, potential or existing channels, and their accompanying recommendations. However, the bundles 148, 149, 168, 169 are not limited by time or number. Once set up, recommendations 103, 104, 107, 108, 110 may simply flow through the bundle in an unaltered fashion, but because they have been organized into a bundle, they become intermediary recommendations, even though the original content 101, 102, 105, 106, 118 has not necessarily changed. In essence, if the bundle is set up by the intermediary recommender, for example recommendation receiver 140, then anything that is sent from, or through, the bundle becomes valuable to some degree that the recommendation receiver 160 assigns trust to recommendation receiver 140.

FIG. 2 illustrates a recommendation network 200 according to an embodiment of the invention. Various elements from FIG. 1 appear which are described above. In FIG. 2, some of the elements from FIG. 1 are shown in an expanded, or blown-up, view to illustrate the embodiment. In FIG. 2, recommendations 103, 104 are shown to both be combined into topic channel 112 to exemplify that recommender 110 recommends them both and also categorizes them into the same topic. Communication 146 illustrates how recommendations 103. 104 are passed along to the receiver 140 and received by device 141. Recommendation receiver 140 may have assigned a specific trust rating 142 so that when recommendations 103, 104 are received by the device 141, then a specific data value may be assigned to recommendations 103, 104. These data values enhance the recommendations because they add additional information to the recommendations 103, 104 which device 141 can use to manipulate and process the recommendations 103, 104, such as via a ranking algorithm, to produce a score 202, by which they can be ranked in a list. Recommendation receiver 140 may further create and utilize filters 261, 262, which can further enhance, or reduce, the score that had been produced. The filters 261, 262 may be additional relative trust ratings, and hence may have similar characteristics to trust ratings already described herein.

As shown in FIG. 2, trust filter 261 may be assigned a value that will actually prevent the recommendation 104 from passing through to be included in any channels and bundles that recommender receiver 140 may create. This is particularly useful for recommendation receivers who trust and value most recommendations from a topic channel, but would like to remove certain offending or non-valuable recommendations from being in any new channels or bundles that they create. Trust filter 262, on the other hand may allow the desirable or valuable recommendations, such as recommendation 103, to be included in new channels or bundles that recommendation receiver 140 creates. The trust filter 262 may, though doesn't have to, enhance the trust value further, as shown by the enhanced score 203. Consequently, recommendation receiver 140 may bundle recommendations from topic channel 112, minus all filtered recommendations, and so recommendation 103, and its accompanying content 101 finds its way through to bundle 148.

Also in FIG. 2, recommendations 107, 108 are shown to be included in separate topic channels 122, 123 respectively. Recommendation receiver 140 may create a general recommender trust rating 143 which may indicate that all recommendations from recommender 120 are to have a certain relative trust rating so that they can be combined into a bundle 149. This bundle 149 may be a termed a "general recommender bundle" since it will include all recommendations from recommender 120 without filtering. Those recommendations 107, 108 may create a certain score 207. At the same time, recommendation receiver 140 may also assign a trust rating specifically to topic channel 122, for example, as an indication of that recommendation receiver 140 trusts recommender 120 even more for the topic of topic channel 122. As a result, the score may be enhanced and become score 206. Recommendation receiver 140 may bundle topic channel into bundle 148.

Bundle 148 may be characterized by any distinguishing characteristic that allows the bundle to be easily distinguished by a user or entity in the network, and therefore, easily recognizable as an item of interest. In one embodiment of the invention, the distinguishing characteristic may be a topic or category that is related to both the topics of topic channel 112 as well as the topic of topic channel 122. Consequently, recommendation receiver 140 has become a recommendation source and provided a bundle relating to a topic that is the same or similar to the previous originating topics of topic channel 112 and 122. However, because the category or topic of bundle 148 can be different (e.g. by refinement, expansion, interpretation of the topic), then recommendation receiver 140 produces an organizing and rating enhancement to the recommendations, and makes it more valuable in the network 200. Thus receiver 140, and other subsequent users who subscribe to bundle 148, can benefit from the recommendation receiver's 140 treatment to the recommendations because there is now more data that can be used to better organize, filter, sort or rank recommendations. The same benefit holds true for bundle 149.

Figure 3:
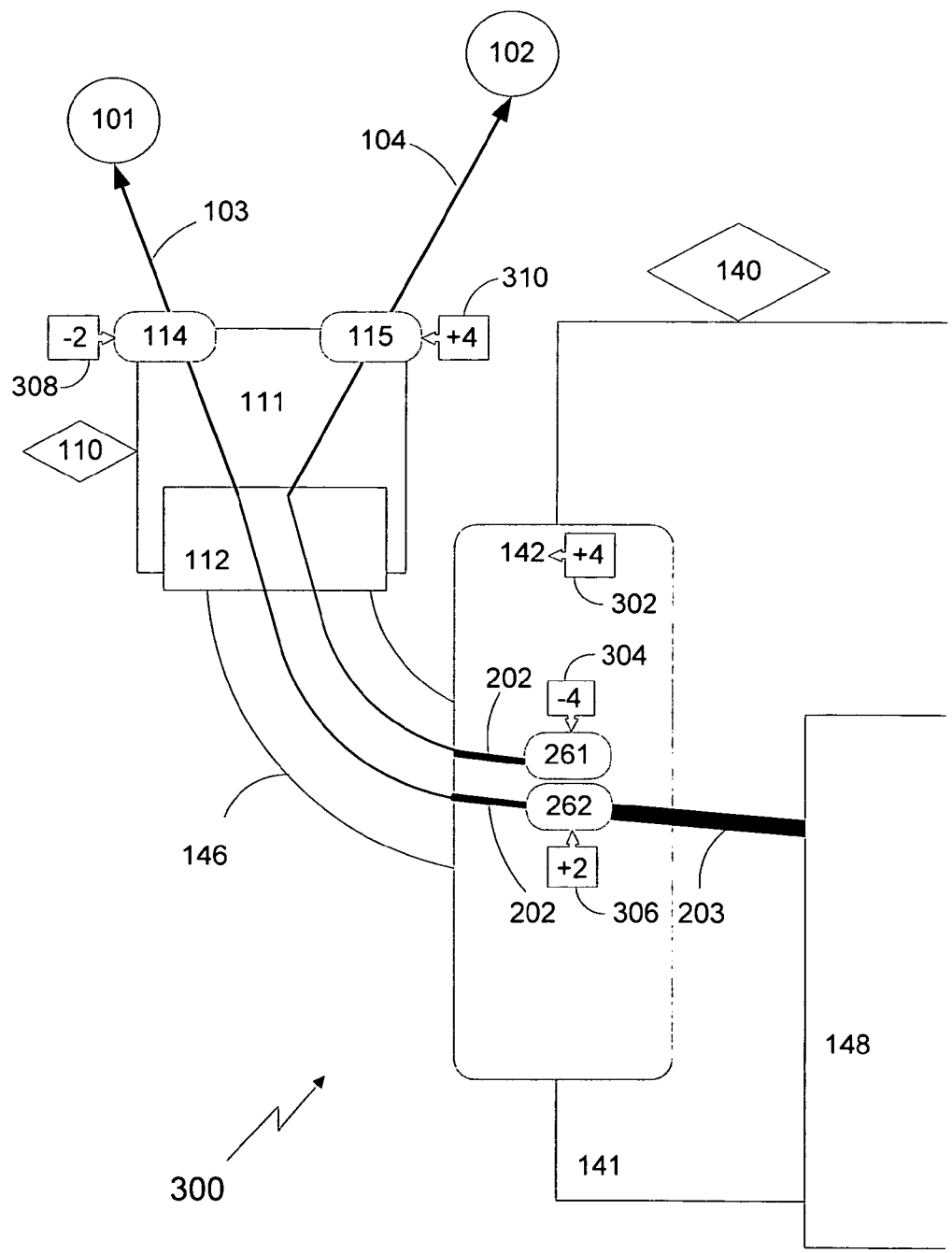
FIG. 3 is a diagram of a recommendation network 300, configured according to an embodiment of the present invention.

FIG. 3 illustrates a recommendation network 300 according to an embodiment of the invention. Various elements from previous figures may appear which have been described further above. In FIG. 3, some of the elements from previous figures may be shown in an expanded, or blown-up, view to help illustrate the embodiment. In FIG. 3, specific numerical values 308, 310, 302, 304, 306 are shown as illustrative of recommendation value ratings 114, 115, trust rating 142, and trust filters 261, 262. These specific numerical values will be discussed in more detail in conjunction with FIG. 5 below.

Figure 4:
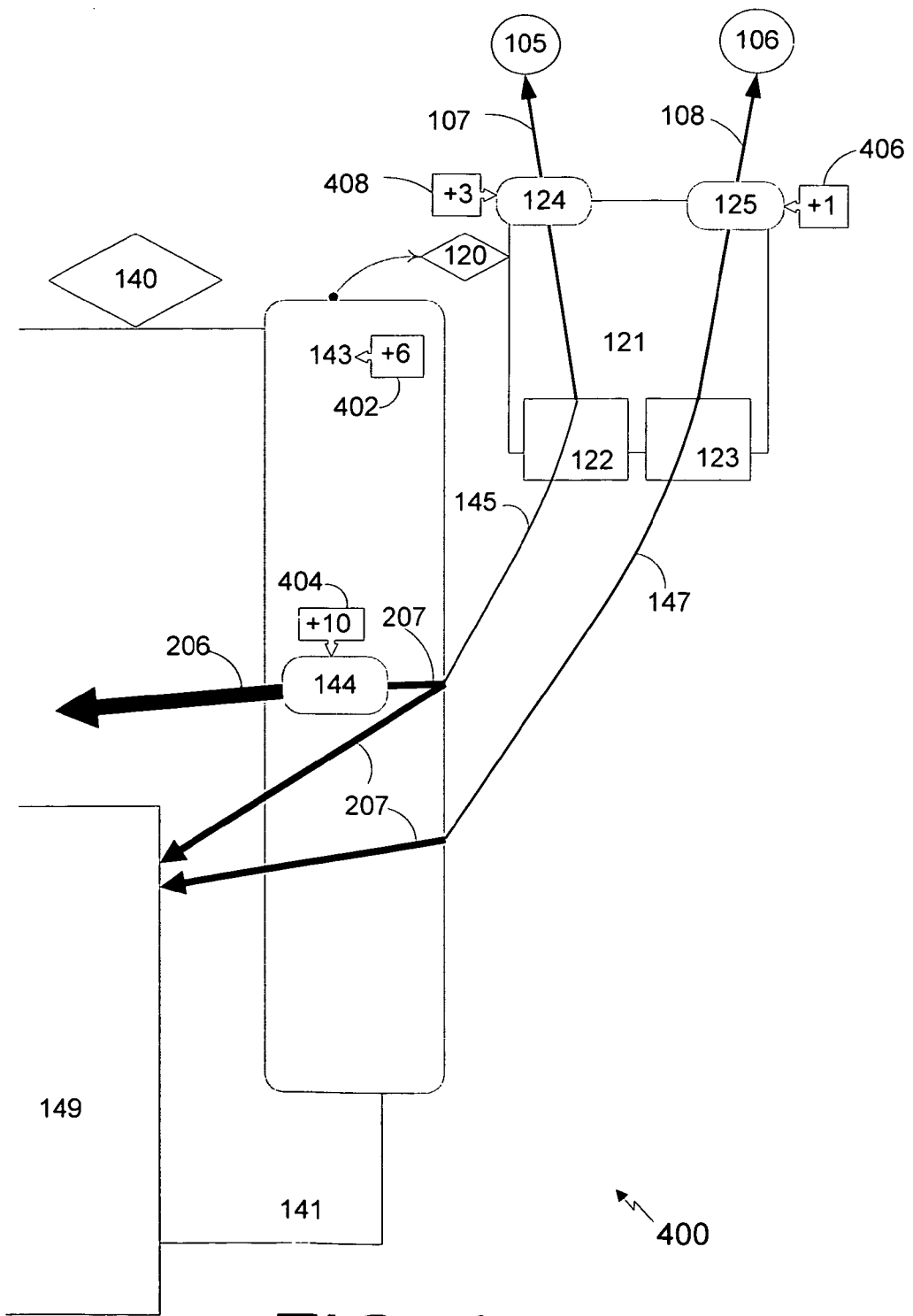
FIG. 4 is a diagram of a recommendation network 400, configured according to an embodiment of the present invention.

FIG. 4 illustrates a recommendation network 400 according to an embodiment of the invention. Various elements from previous figures may appear which have been described further above. In FIG. 4, some of the elements from previous figures may be shown in an expanded, or blown-up, view to help illustrate the embodiment. In FIG. 4, specific numerical values 402, 404, 406, 408 are shown as illustrative of recommendation value ratings 124, 125, and trust ratings 143, 144. These specific numerical values will be discussed in more detail in conjunction with FIG. 5 below.

FIG. 5 illustrates a recommendation network 500 according to an embodiment of the invention. Various elements from previous figures may appear which have been described further above. In FIG. 5, some of the elements from previous figures may be shown in an expanded, or blown-up, view to help illustrate the embodiment. In FIG. 5, an object 502 is shown to contain the contents of bundles 148 and 149. The object contains information about the bundle including the bundles name 504, the recommended content 506 minus filtering, the recommendation value ratings 508 from the recommender who provided the recommendations, as well as any trust ratings 510 from the recommender receiver 140. These recommendation value ratings 508 and trust ratings 510 can be utilized, such as by processing with an algorithm, to create the scores 202, 203, 206 and 207 shown previously in conjunction with FIG. 2, FIG. 3, and FIG. 4 above.

In one embodiment of the invention, the device 141, or any other device mentioned herein, may utilize a variety of algorithms, such as a summation algorithm, an averaging algorithm, or a combination of the two. Other algorithms may include utilizing characteristics of recommenders to ascertain which trust ratings are weighted higher in the algorithm. The recommendation receiver 140 may utilize any number of, or combination of, algorithms and variables to craft the results that are most agreeable to the recommendation receiver 140, based on the receivers 140 own opinion of how to process ratings for specific types of content, such as for highly technical content, or content of a deeply individualized opinion, such as religion or politics. For those types of content, then the receiver 140 may wish to utilize an algorithm that highly favors trust ratings. Hence, in addition to being able to provide ratings, which allows the rating entities to manipulate the variables process within an algorithm, the recommendation network may also allow the receiver the flexibility to manipulate the method of processing those variables within the algorithm. Thus the receiver 140, or any other recommendation receiver described herein, may have a great deal of flexibility in determining what content is the most relevant or trustworthy.

Figure 6:
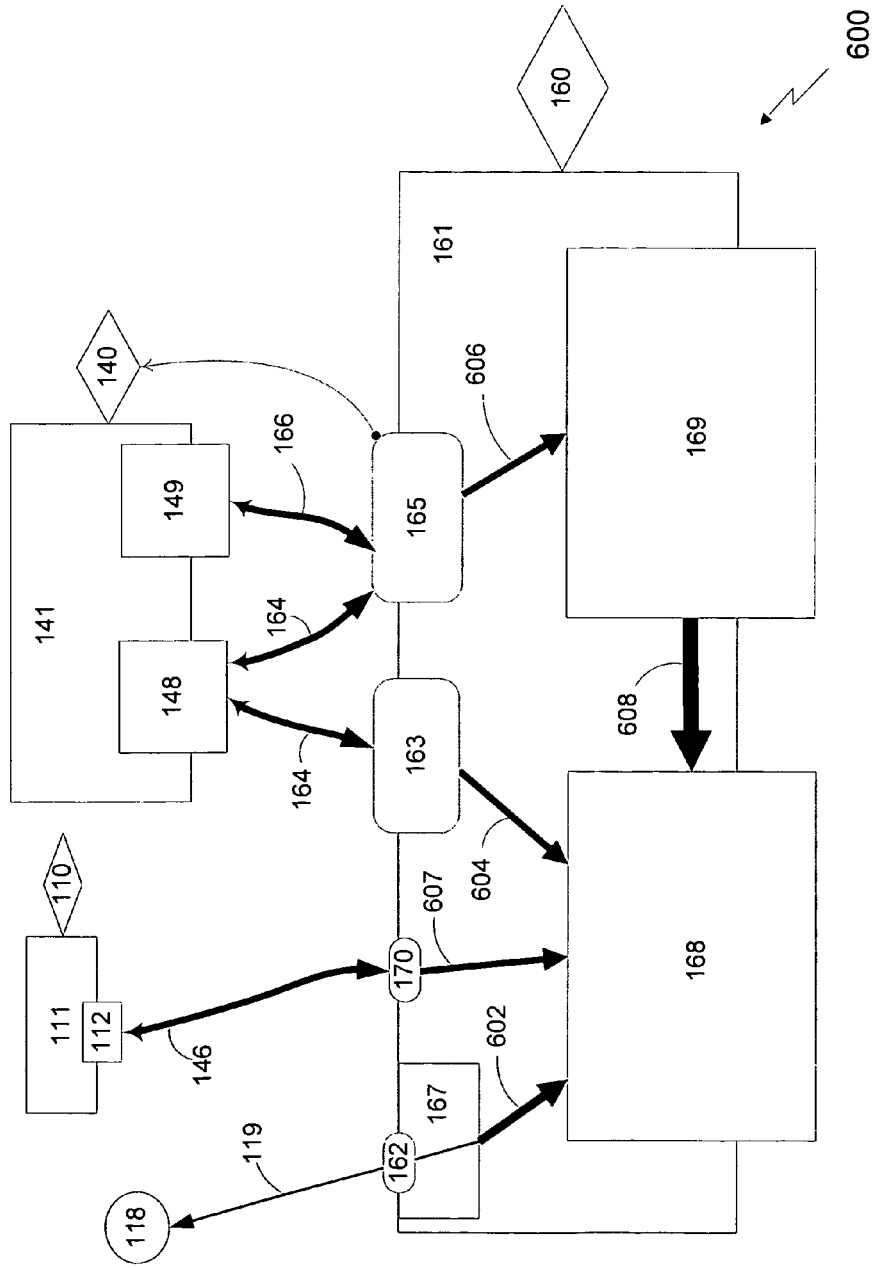
FIG. 6 is a diagram of a recommendation network 600, configured according to an embodiment of the present invention.

FIG. 6 illustrates a recommendation network 600 according to an embodiment of the invention. Various elements from previous figures may appear which have been described further above. In FIG. 6, some of the elements from previous figures may be shown in an expanded, or blown-up, view to help illustrate the embodiment. In FIG. 6, recommendation receiver 160, with device 161, may do anything that recommenders 110, 120, can do with their respective devices, 111, 121 and may also do anything that recommendation receiver/bundler 140 may do with its respective device 141. Thus, recommendation receiver 160 may make a recommendation 119 of content 118, may assign a recommendation value rating 162 to the recommendation 119, and may create topic channel 167 then assign the recommendation 119 to the topic channel 167. The recommendation receiver 160 may also receive bundles 148, 149, via recommendation communications 164, 166, assign trust ratings 163, 165 to recommendation source 140 regarding bundles 148, 149, may create new bundles 168, 169, and may assign the topic channels and bundles 148, 149 to the new bundles 168, 169. There is no limit to the number of recommendation bundles that recommendation receiver 160 may create and recommend. Recommendation receiver 160 may also receive topics channels, such as topic channel 112 from recommender 110, assign trust values, such as trust value 170 to recommender 110 regarding topic channel 112, and assign the topic channel 112 to a bundle, such as to the new bundle 148. Device 161 may also create scores 602, 604, 606, 607, 608 which can be utilized to rank content that is contained in the received bundles 148, 149 and the topic channels 167, 112.

Bundle 169 may be another exemplary "recommender" bundle wherein all recommended bundles from recommendation receiver/bundler 140 are included in the bundle 169. Bundle 168, however, may be characterized by a topic or category that is somehow related in the mind or perspective of recommendation receiver 169, to the topics of topic channel 112 as well as the topic of topic channel 167, as well as the topics or some other distinguishing characteristic of recommendation bundles 148 and 169. Consequently, recommendation receiver 160 has become a recommendation source, a recommender and a bundler, and can provide additional bundle relating to a topic that is similar, or related (although it doesn't have to be similar) to the previous originating topics of topic channel 112, 167, bundle 148 and bundle 169. However, because the category or topic of bundle 148 can be different from the previous topics, even slightly different, (e.g., broader, more refined, or horizontally related, etc.), then recommendation receiver 160 produces an organizing and rating enhancement to the recommendations, and makes then more valuable in the network 200. Thus receiver 140, and other subsequent users who subscribe to bundle 168, can benefit from the recommendation receiver's 160 treatment to the recommendations because there is now more data that can be used to better organize, filter, sort or rank recommendations. The same benefit holds true for bundle 169.

The recommendation receiver 160, (now also recommender 160 or bundler 160), may also filter recommendations out of the bundle. Furthermore, the bundles 168, 160 may automatically recognize, define, or classify, any of the recommendations contained included in that bundle 250 with the new category or topic assigned by recommendation receiver 160 to the bundle 148. In other embodiments of the invention, the bundles 168, 169 may be related to characteristics of the previous recommenders. In yet other embodiments of the invention, the bundle may be related to characteristics of the recommendation receiver 160. Hence, the bundles need not necessarily be assigned to a topic, but may have any distinguishing characteristic that allows the bundle to be easily distinguished by a user or entity in the network, and therefore, easily recognizable as an item of interest.

Figure 7:
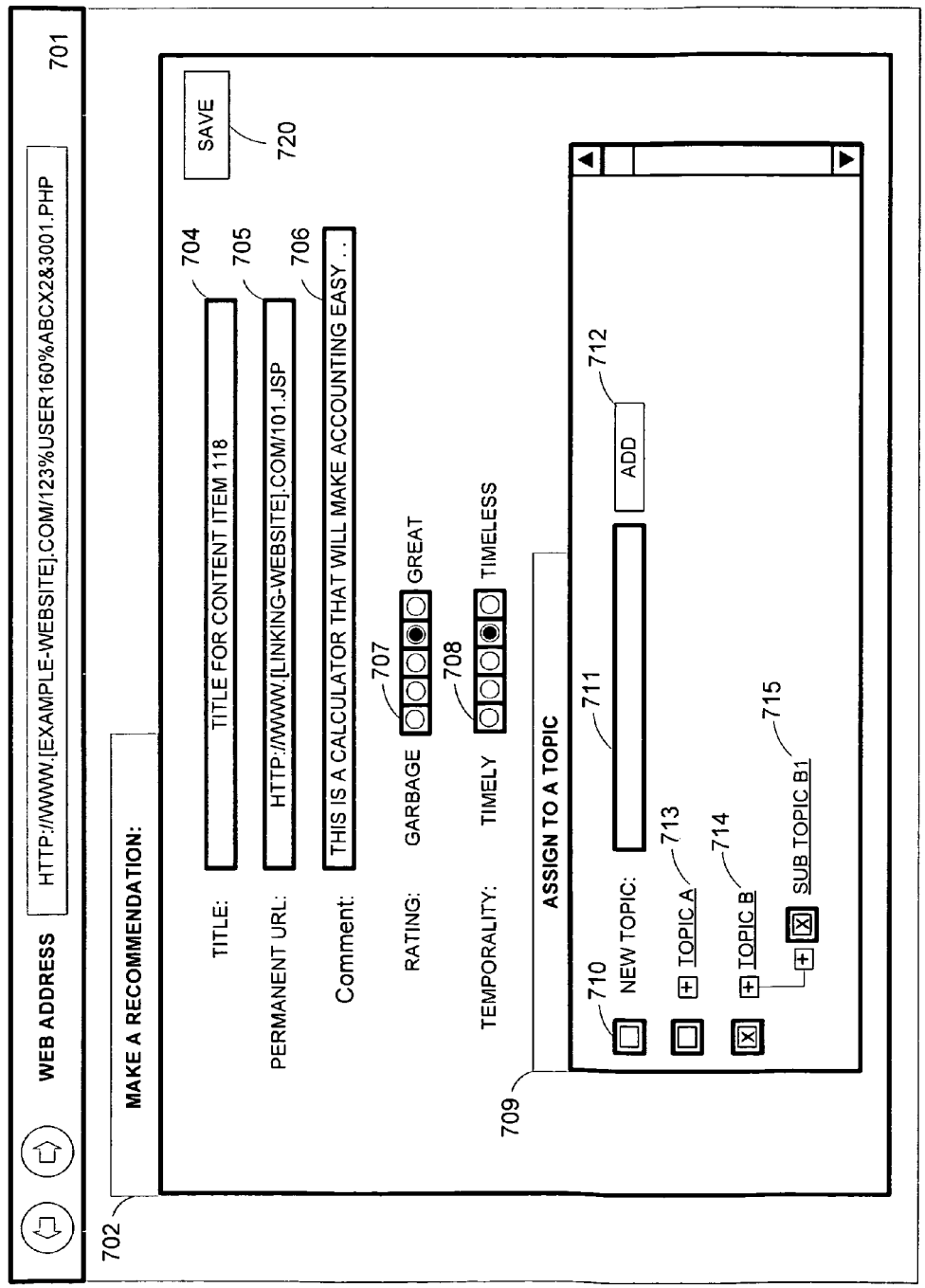
FIG. 7 is a representation of a recommendation network 700, configured according to an embodiment of the present invention.

FIG. 7 illustrates a recommendation network 700 according to an embodiment of the invention. In FIG. 7, a web site 701 may include a graphical user interface (GUI) with a recommendation console 702 to allow a user to make a recommendation. The recommendation console 702 may include a title field 704 for entering a short descriptive title by which an item of recommended content may be recommended or referred. The recommendation console 702 may also include web address field 705 to enter the permanent URL for recommended content. Further included may be a comment field 706 to further describe the content beyond what is included in the short descriptive title field 704. Also included may be a recommendation value rating field 707 for entering a recommendation value. The recommendation value rating field 707 may be part of a scale of values. Also included may be a temporality rating field 708 to indicate to what degree the content is relevant over time. A popular content item of the day, related to current events, though not particularly relevant or interesting as time goes on, may get a rating close to the "timely" end of the scale. On the other hand, a content item that has relevance over a long period of time, such as an article on a scientific principle, may have a rating close to the "timeless" end of the scale.

A topic listing 709 may also be included which lists various topics or topic channels 713, 714, and subtopics or subtopic channels 715. A new topic field 711 may also be included from which the user can create a new topic or topic channel. Buttons 710 and 712 may be used to create the new topic that is entered into the new topic field 711.

Figure 8:
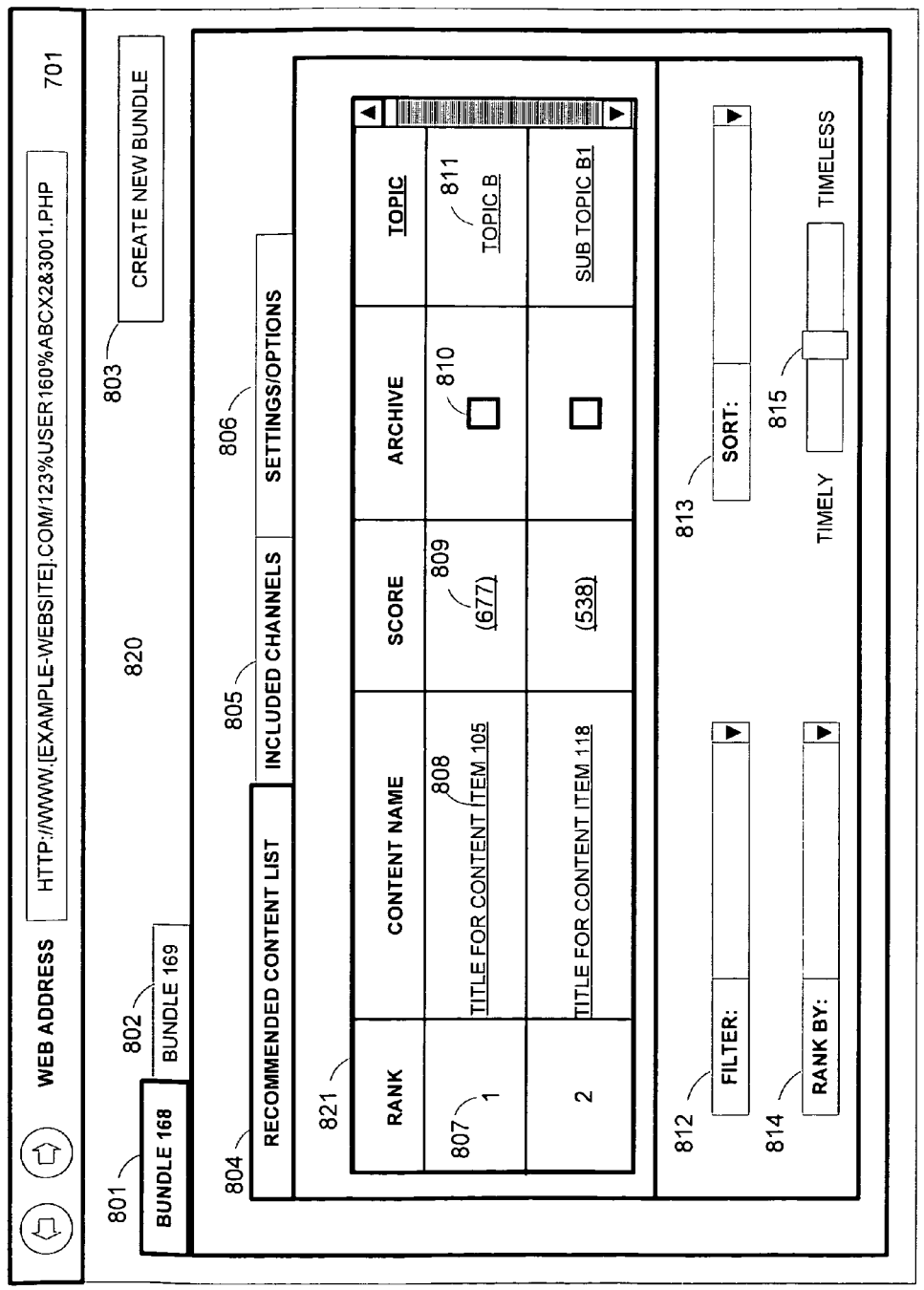
FIG. 8 is a representation of a recommendation network 800, configured according to an embodiment of the present invention.

FIG. 8 illustrates a recommendation network 800 according to an embodiment of the invention. Various elements from previous figures may appear which have been described further above. In FIG. 8, the website 701 may include a bundle manager console 820, that may include individual bundle consoles 801, 802, as well as a new bundle button 803, to create a new bundle. Bundle console 801 may include various sub-consoles like a ranked content list tab 804, a channel list tab 805, and a settings tab 806.

The content list tab 804 may include a ranked list of recommended content contained within channels that are included in the bundle and shown on the channel list tab 805 described in conjunction with FIG. 9 below. Still referring to FIG. 8, a ranked content list 821 may be included on the content list tab 804. The ranked content list 821 may include descriptive data and links, like a rank 807 to describe the position on the ranked content list 821 of an individual recommended content item accessible via content link 808 to permit the user to access the content. A rank score link 809 may display the score that the content item received. The rank score link 809 may be a link to permit the user to access a description of how the score was produced, including relevant recommendation value ratings, trust value ratings, recommendation sources, such as recommenders, bundlers, bundles, topic channels, etc., that have been involved in recommending that content item. Furthermore, an archive button 810 may be included that may remove the content item from the ranked list 821 after it has been visited by the user. Other information 811 may also be included on the ranked list 821, such as an associated topic. A filter function 812, such as dropdown selector or a filter entry field may be included to filter the ranked content list 821 according to specific criteria. Likewise a sort function 813, such as a dropdown selector or a sort entry field, may be included to sort the ranked content list 821. A rank-by function 814, such as a dropdown selector or an entry field may be included to define ranking criteria or algorithms. A temporality filter function 815, such as a slider, may be included to allow the ranked content list 821 to show content that is relevant in a timely or timeless fashion according to a temporality rating that may have been assigned to the content by recommenders.

Figure 9:
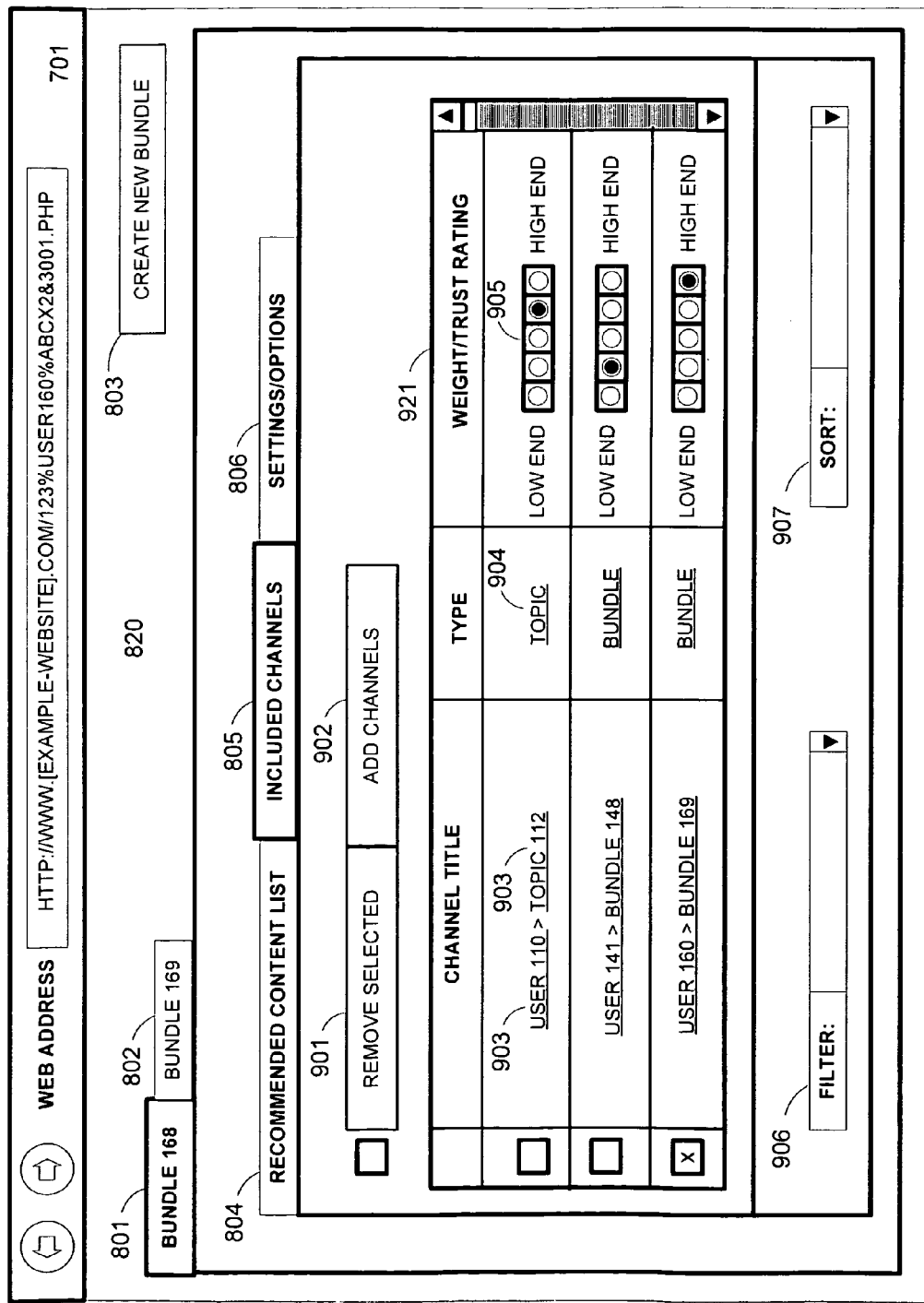
FIG. 9 is a representation of a recommendation network 900, configured according to an embodiment of the present invention.

FIG. 9 illustrates a recommendation network 900 according to an embodiment of the invention. Various elements from previous figures may appear which have been described further above. In FIG. 9, the channel list tab 805 is described in more detail. The channel list tab 805 may include a channel list 921 that belong to, or are included in the bundle. The channel list may include a channel title link 903 that can describe the recommendation source, such as the recommender or bundler that provided the channel, as well as a channel title, such as the topic channel title or the bundle name. The channel title link 903 may permit the user to access more information regarding the recommendation source or the channel. More than one link may be included as part of the channel title link, such as separate links to a channel description page or a link to a recommender page. A channel type link 904 may also be included to describe the type of channel, such as being either a topic channel or a bundle. A trust rating field 905 may also be included on a scale or trust ratings for the user to assign a trust rating to the recommendation source of the channel (e.g., recommender 110 on topic channel 112 gets a high trust rating closer to the high end of the scale as the user may have a high degree of trust in recommender 110 regarding the topic of channel 112).

A filter function 906, such as dropdown selector or a filter entry field may be included to filter the channel list 921 according to specific criteria. Additional channel filters may be set for the channel, for example by clicking on the channel title link 903 that may allow the user to set specific trust filters. Likewise a sort function 907, such as a dropdown selector or a sort entry field, may be included to sort the channel list 921.

A channel adder function, such as channel addition button 902, may also be included. The channel addition button 902 may launch a directory of channels or a search page where the user can browse or search for desired channels. A channel removal function, such as channel remover button 901 may also be included to remove channels from the bundle.

Figure 10:
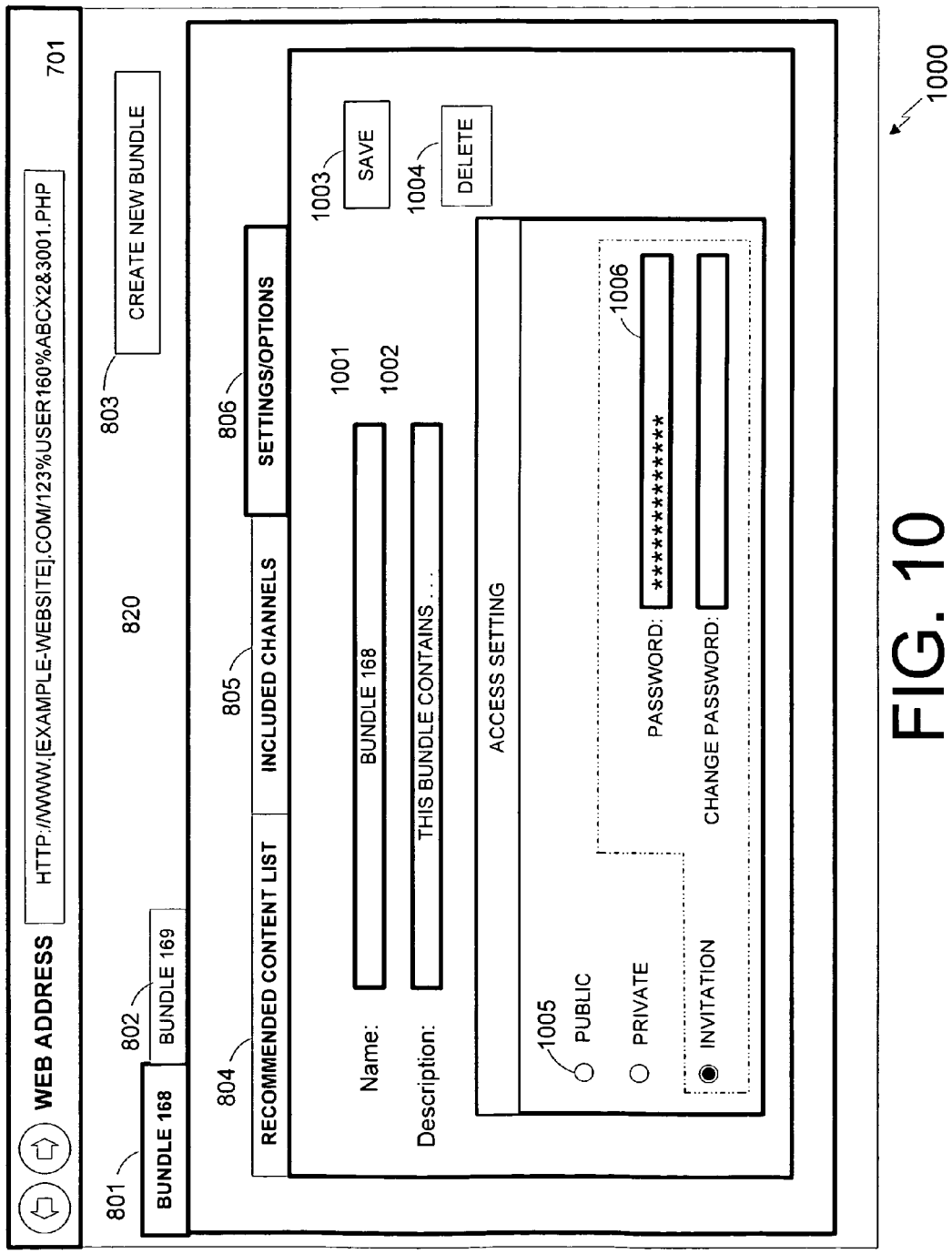
FIG. 10 is a representation of a recommendation network 1000, configured according to an embodiment of the present invention.

FIG. 10 illustrates a recommendation network 1000 according to an embodiment of the invention. Various elements from previous figures may appear which have been described further above. In FIG. 10, the bundle settings tab 806 is described in more detail. The bundle settings tab 806 may include descriptive elements of the bundle itself, such as bundle name field 1001 to give the bundle a short descriptive name and a bundle description field 1002 to add additional information beyond that possible in the bundle name field 1001. A bundle save function, such as bundle save button 1003 may also be included to save the bundle or changes to the bundle settings. A bundle delete function, such as bundle delete button 1004 may also be included to delete the bundle. An access setting function, such as access setting button 1005 may be included to set the access that other recommendation receivers may have to the bundle. For example, the bundle may be set to have an access setting of "public", whereby any entity can access and use the bundle in subsequent bundles on the network. If the bundle is set to an access setting of private, then perhaps only the bundler, or bundle creator, may have access to use the bundle on the network. On the other hand, the bundle may be set to an access setting of "invitation", whereby only invited entities may know of, or use, the bundle, if they are provided with the proper password to authenticate their access rights. A bundle password field 1006 may be provided to store that password, or change it, as necessary.

Figure 11:
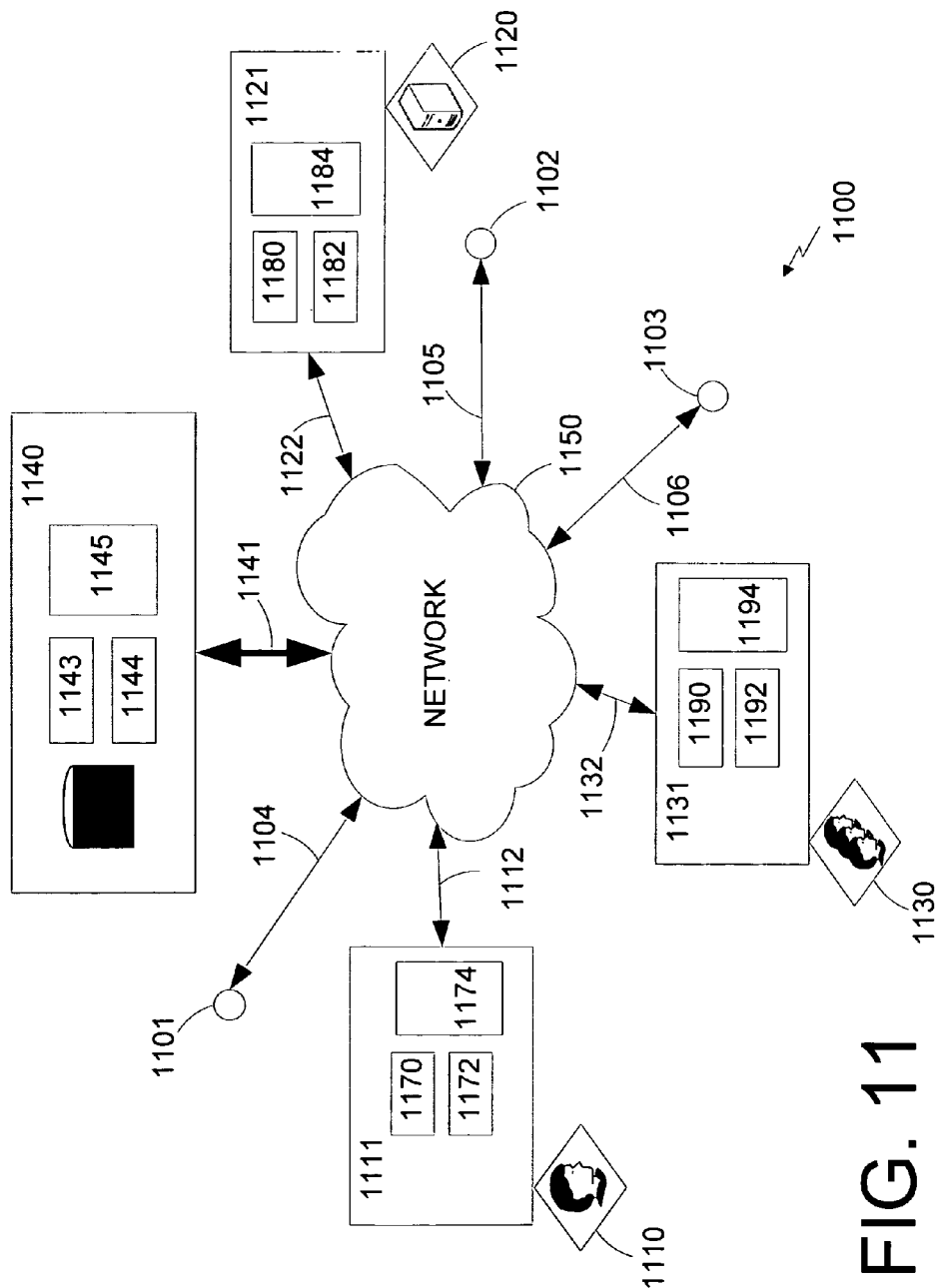
FIG. 11 is a representation of a recommendation network 1100, configured according to an embodiment of the present invention.

FIG. 11 illustrates a recommendation network 1100 according to an embodiment of the invention. FIG. 11 is a representation of a recommendation network 1100, comprising any of the embodiments of the invention described in conjunction with FIG. 1 through FIG. 10, but described in a more simplistic network diagram, to simplify the complexity shown of the various interrelations between entities. The recommendation network 1100 may include a plurality of recommendation network entities, 1110, 1120, 1130. Each one can represent any, or all, of the roles described herein, such as recommender, recommendation receiver or bundler, as described more fully in embodiments of the invention herein. Each entity 1110, 1120, 1130 may utilize a communication device 1111, 1121, 1131 to make communications 1112, 1122, 1132 across a computerized network 1150. The communication devices may be similar to any of the devices described herein, such as the computer device described in conjunction with FIG. 12 below. The communications 1112, 1122, 1132 may represent any one of recommendations or channel communications, such as topic channel or bundle communications described in embodiments of the invention herein. Content recommendations 1104, 1105, 1106 may represent recommendations about content 1101, 1102, 1103, from any of the recommendation network entities 1110, 1120, 1130, or from other entities not shown.

In addition, the recommendation network 1100 may also include a server device 1140 to receive server communications 1141, which may comprise communications 1112, 1122, 1132 and recommendations 1104, 1105, 1106. The server device 1140 may also receive and store ratings and preferences of the various entities. As a result, the server device 1140 can process, analyze, compute or in any other way manipulate the communications 1112, 1132, 1122, recommendations 1104, 1105, 1106, ratings, rating criteria, or any other information provided to it from the recommendation network entities 1110, 1120, 1130 through their respective communication devices 1111, 1121, 1131. The server device 1140 can also return, relay, or transmit, any communications 1112, 1122, 1132 or recommendations 1104, 1105, 1106 across the network. The server device 1140 may be a computer system as shown in exemplary FIG. 12. In addition, the server device 1140 may include a database 1142 configured specifically for use with a recommendation network application, to store specific data and meta data regarding preferences of entities 1110, 1120, and 1130, including recommendations, bundles, ratings, rating criteria, etc.

The server device 1140 may also be utilized, either itself, or in conjunction with other servers or devices not shown, to host a website for use by any of the recommendation network entities 1110, 1120, 1130, or other entities, over the network 1150, to make queries, make or view recommendations, create bundles, subscribe to bundles, make or edit ratings and rating criteria or perform any other process or method described herein. Recommendation network entities 1110, 1120, 1130 can access the website via a user interface accessible through the communication devices 1111, 1121, 1131, any of which may be computer systems, such as the exemplary computer system described in exemplary FIG. 12.

In addition, the server device 1140 may rate, rank, sort, filter, process queries, produce results, etc., based on any number of algorithms that include as its variables or include data related to items, recommendation sources, channels, content, topic channels, ratings and rating criteria, recommenders, recommendation receivers, bundlers, bundles or any other information provided by the recommendation network entities 1110, 1120, 1130, or others, over the network 1150.

Furthermore, as shown in FIG. 11, the server may utilize machine readable medium that may utilize computerized instructions, such as software modules. For example, the server may utilize a recommendation rating module 1143, a trust rating module 1144, or a bundle module 1145. The recommendation rating module 1143 may be utilized to track and process recommendation value ratings made by the entities 1110, 1120, 1130. The trust rating module 1144 may be utilized to track and process trust ratings made by the entities 1110, 1120, 1130. The bundle module 1145 may be utilized to maintain bundles that may be created by the entities 1110, 1120, 1130. All of these modules may tie into the database 1142 to read and write information, and coordinate with profile or preferences settings, or other data and meta-data, that pertain to the particular user entities 1110, 1120, 1130.

Client software modules may be utilized by the communication devices 1111, 1121, 1131 as well. For example, the communication devices 1111, 1121, 1131 may utilize recommendation rating modules 1170, 1180, 1190 to assist in the creation and modification of recommendation value ratings. Furthermore, the communication devices 1111, 1121, 1131 may utilize trust rating modules 1172, 1182, 1192 to assist in the creation and modification of trust ratings. Finally, the communication devices 1111, 1121, 1131 may utilize bundle modules 1174, 1184, 1194, to assist in the creation and modification of bundles.

Consequently, because the network entities may be making and modifying recommendation value ratings, trust ratings, or bundles, the communication devices 1111, 1121, 1131 or the server device 1140 may be referred to as "content rating devices", "recommendation value rating devices", "trust rating devices", "channel creation devices", "bundling devices", etc., depending on the particular function they may participate in, or role that they may serve, at any given time. Likewise, therefore, the network user entities 1110, 1120, 1130, may be referred to as "content rating" entities, "recommendation value rating" entities, "trust rating" entities, or "bundling" entities, depending on the particular function that they may participate in, or role that they serve, at any given time.

Figure 12:
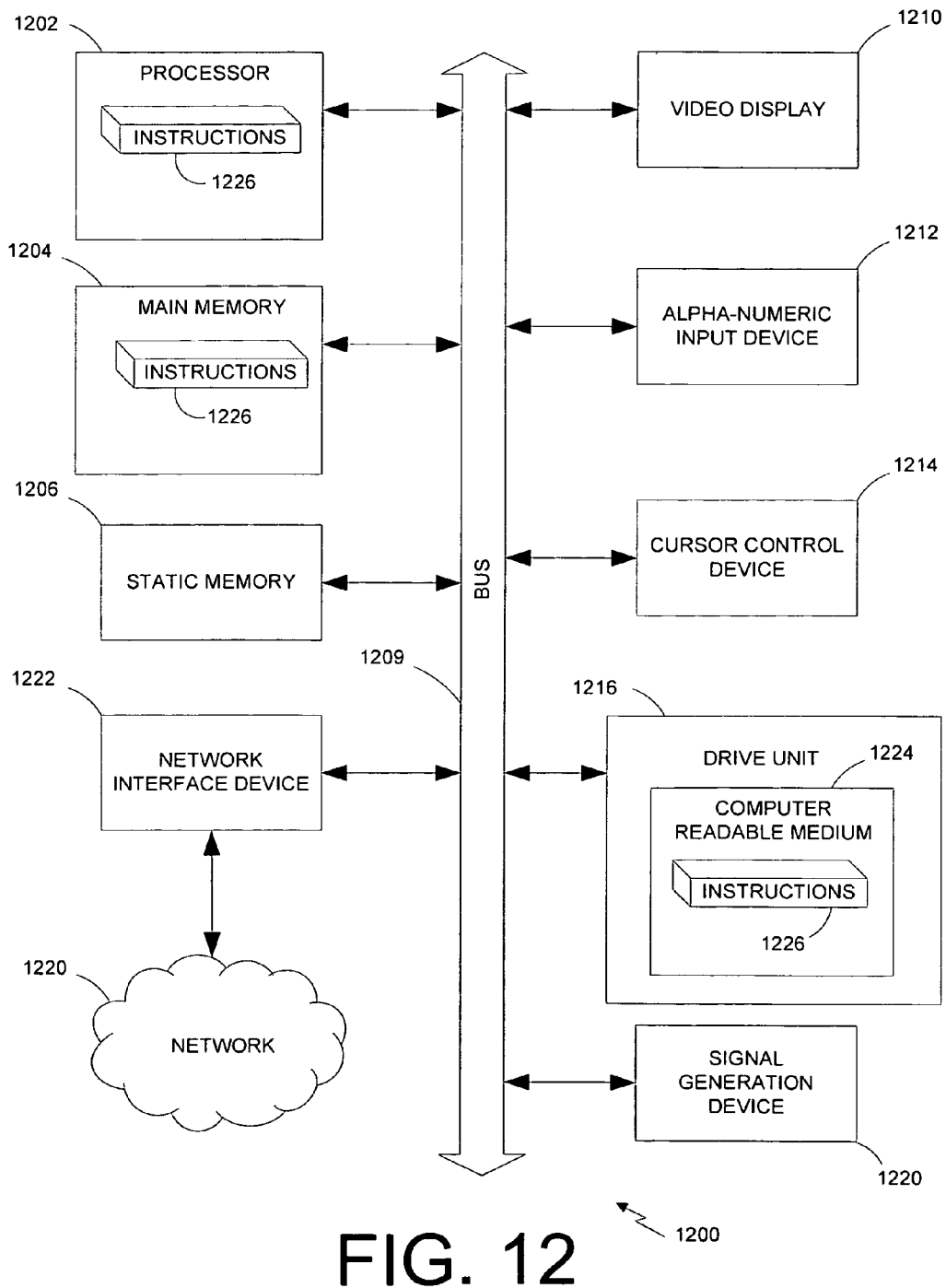
FIG. 12 shows a diagrammatic representation of a communication device in the exemplary form of a computer system 1200.

FIG. 12 shows a diagrammatic representation of a communication device in the exemplary form of a computer system 1200 within which a set of instructions, for causing the machine to perform any one of the embodiments of methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1200 includes a processor 1202, a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also may include an alphanumeric input device 1212 (e.g., a keyboard), a cursor control device 1214 (e.g., a mouse), a disk drive unit 1216, a signal generation device 1220 (e.g., a speaker) and a network interface device 1222.

The disk drive unit 1216 includes a computer-readable medium 1224 on which is stored a set of instructions (e.g., software, algorithms, etc.,) 1226 embodying any one, or all, of the embodiments of methodologies described above. The instructions 1226 are also shown to reside, at least partially, within the main memory 1204, within the processor 1202, or within the computer-readable medium 1224. The instructions 1226 may further be transmitted or received via the network interface device 1222. For the purposes of this specification, the term "computer-readable medium" shall be taken to include any medium that is capable of storing or encoding a sequence of instructions for execution by the computer and that cause the computer to perform any one of the embodiments of methodologies of the present invention. The term "computer-readable medium" shall accordingly be taken to include, but not be limited to, solid-state memories, optical and magnetic disks, and carrier wave signals.

Method

Figure 13:
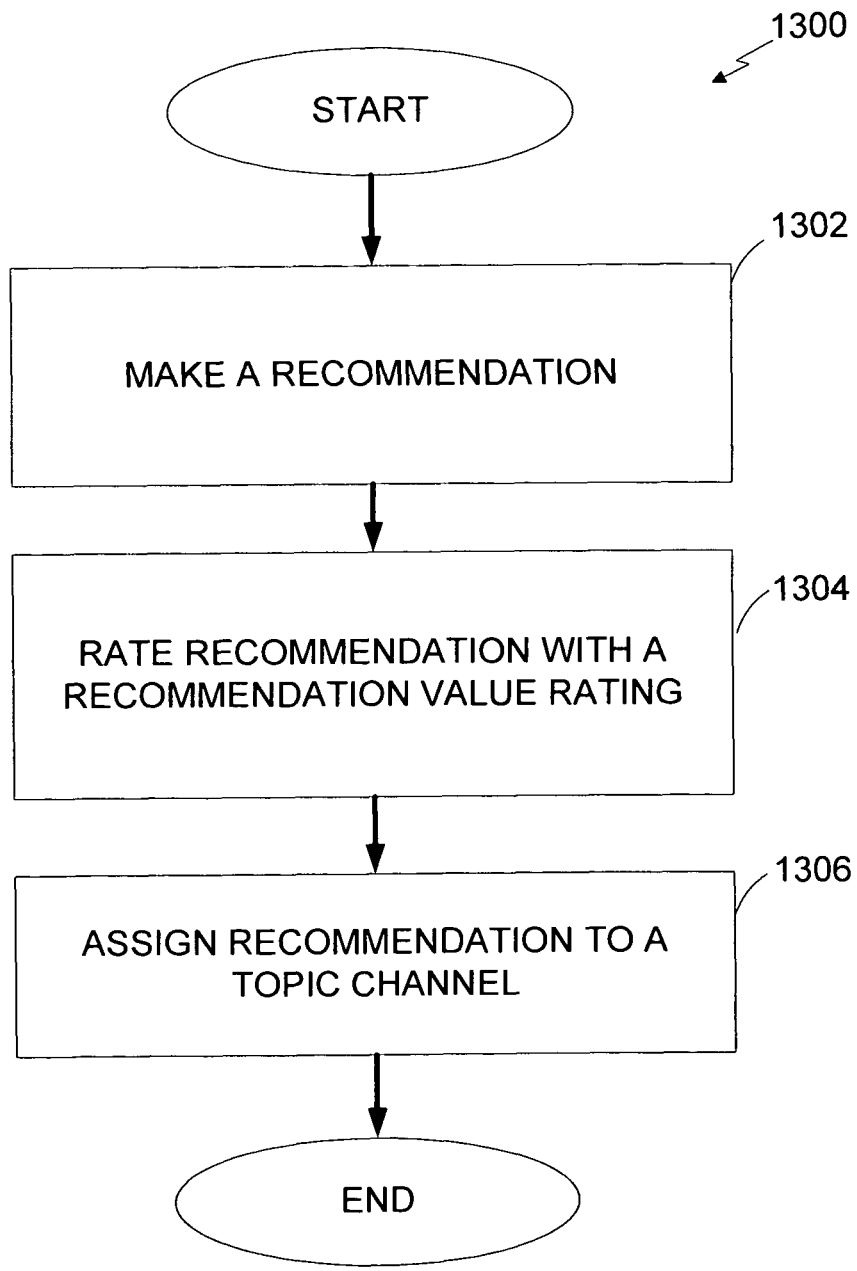
FIG. 13 is a flow diagram of one embodiment of a method 1300 for making and transmitting recommendations over a recommendation network.

FIG. 13 is a flow diagram of one embodiment of a method 1300 for making and transmitting recommendations over a recommendation network. Method 1300 begins, at processing block 1302, with making a recommendation. The method 1300 continues, at processing block 1304, with rating the recommendation with a recommendation value rating. Then, the method 1300 continues, at processing block 1306, with assigning the recommendation to a channel, such as a topic channel.

Figure 14:
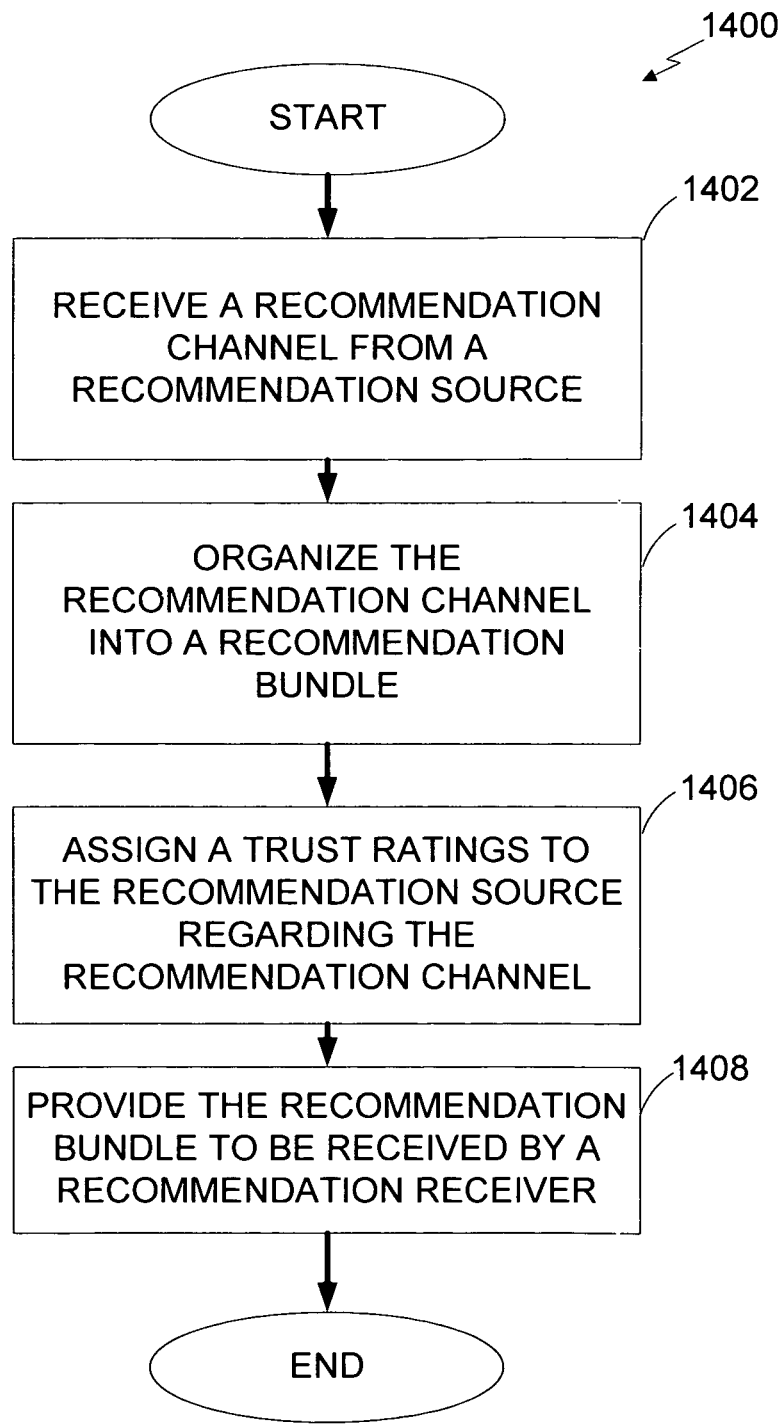
FIG. 14 is a flow diagram of another embodiment of a method 1400 for making and transmitting recommendations over a recommendation network.

FIG. 14 is a flow diagram of one embodiment of a method 1400 for making and transmitting recommendations over a recommendation network. Method 1400 begins, at processing block 1402, with receiving a recommendation channel form a recommendation source. The method 1400 continues, at processing block 1404, with organizing the recommendation channel into a recommendation source. Then, the method 1400 continues, at processing block 1406, with assigning a trust rating to the recommendation source regarding the recommendation channel. The method 1400 further continues, at processing bloc 1408, with providing the recommendation bundle to a recommendation receiver.

Figure 15:
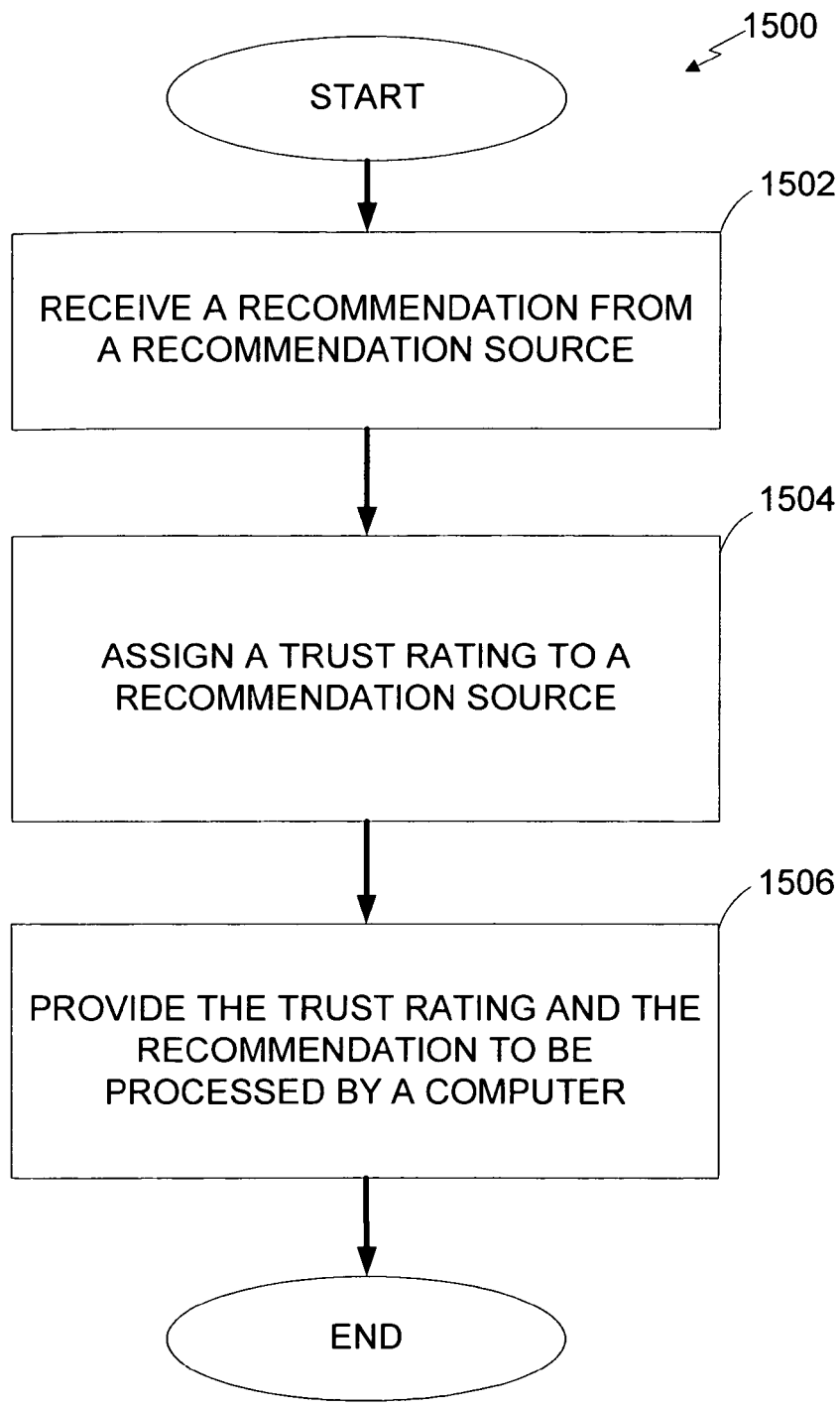
FIG. 15 is a flow diagram of another embodiment of a method 1500 for making and transmitting recommendations over a recommendation network.

FIG. 15 is a flow diagram of one embodiment of a method 1500 for making and transmitting recommendations over a recommendation network. Method 1500 begins, at processing block 1502, with receiving a recommendation. The recommendation may have been assigned a recommendation value rating or a temporality rating. The method 1500 continues, at processing block 1504, with assigning a trust rating to a recommendation source. Method 1500 then continues, at processing block 1506, with providing the trust rating and the recommendation, including any one of the recommendation value rating or the trust rating, to be processed by a computer.

Figure 16:
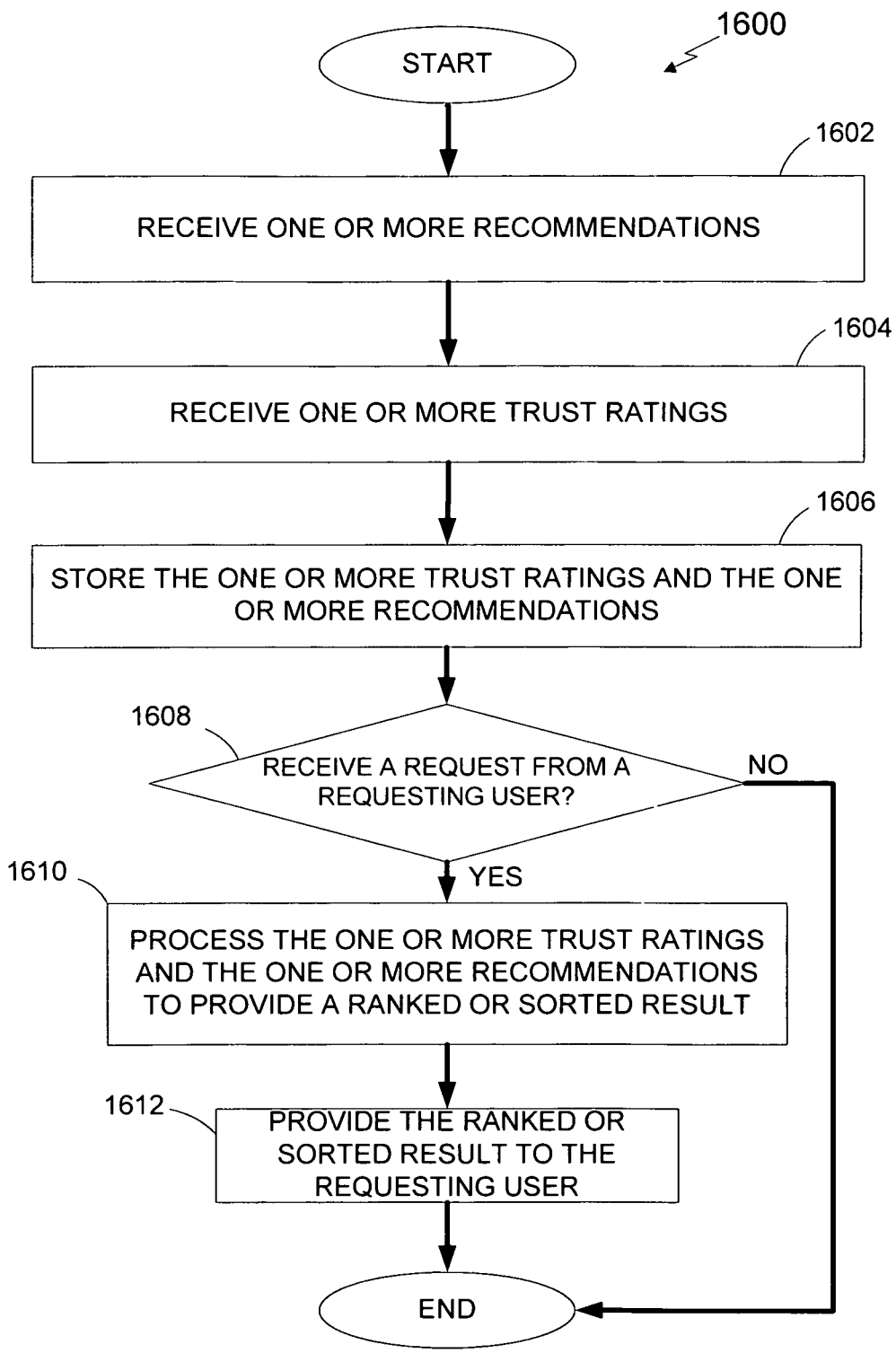
FIG. 16 is a flow diagram of another embodiment of a method 1600 for making and transmitting recommendations over a recommendation network.

FIG. 16 is a flow diagram of one embodiment of a method 1600 for making and transmitting recommendations over a recommendation network. Method 1600 begins, at processing block 1602, with receiving one or more recommendations, which may include one or more recommendation value ratings or one or more temporality ratings. Method 1600 then continues, at processing block 1604, with receiving one or more trust ratings. Method 1600 then continues, at processing block 1606, with storing the one or more trust ratings and the one or more recommendations. Method 1600 then continues, at processing block 1608, with receiving a request from a requesting user. If so, then method 1600 continues, at processing block 1610, with processing the one or more trust ratings and the one or more recommendations, which may include the one or more recommendation value ratings or temporality ratings, to provide a ranked or sorted result. Method 1600 then continues, at processing block 16012 with providing the ranked or sorted result to the requesting user.

Additional Example Embodiments

The following describes some additional example embodiments of a content recommendation system ("system").

Automatically generating recommendation ratings. In some embodiments, the system can receive a content recommendation from a recommender source. The content recommendation can be assigned to a topic, a classification, a type, etc. The content recommendation can include metadata that describes the topic. The topic can be received with the content recommendation as metadata that was assigned to the content recommendation by the recommender source. In some embodiments, the topic can be assigned automatically when feed through a bundle or channel. In some embodiments, the system further detects a trust rating assigned to the recommender source specifically for the topic. The trust rating represents a degree of trust in the recommender source to provide content recommendations of value specifically for the topic. For example, the trust rating may have been assigned to the recommender source by a user source within a trust network as described previously. The trust rating represents a degree of trust that the user source has in the recommender source to provide the content recommendations of value specifically for the topic. In some embodiments, the system further determines that the recommended content was recommended, but was recommended without a distinct value that specifies a degree of preference for the recommended content. For instance, the recommender source may have listed the content on a website, sent the content via a news feed, forwarded the content, entered a link to the content, etc., but did not assign a recommendation rating value (e.g., did not assign a number of stars, did not provide a numerical rating value, did not assign a relative rating on a scale of values, etc.). The system, however, automatically assigns a recommendation rating to the content recommendation as an implied degree of preference that the recommender source has for the content recommendation.

The system can automatically assign the recommendation rating based on a number of factors. In one example, the system assigns a default recommendation rating (e.g., assigns three stars out of five) as a default value for any recommendations that are received without a specific recommendation rating value. The system can further indicate to a user that the content was assigned a default recommendation rating. Thus, the system indicates that although the content has been scored and weighted according to the trust weighting, it was scored with a default recommendation value, and, therefore, the content may in fact be more worthwhile than the score appears to indicate as the recommender source may have rated the content higher than the default value.

In some embodiments, the system can assign a recommendation rating, and/or bias the default rating higher or lower, based on metadata included in the content. For example, if a user source trusts the recommender source to a high degree for the topic (e.g., has assigned a high trust rating for the topic), but the user source generally disagrees or disapproves of certain content that (1) originates from a specific origin, (2) has one or more sub-topics, (3) has already been viewed or rated by the user source, or (4) is characterized, via metadata, in some other way that is not preferable to the user source, the system can bias the default recommendation value lower. As an example, the system can determine that the content originates from a specific network address and, consequently, the system can assign a recommendation rating to the content with a value substantially equivalent to content ratings for previously provided recommendations from the network address. For instance, if the recommended content is a link that specifies a domain name (e.g., nytimes.com), the system can analyze recommendations from that source that were previously submitted (e.g., by the recommender source or other recommender sources) for that topic, which were rated by their recommenders. The system can further analyze whether the user source who received the content recommendation approved or disapproved of previously submitted recommendations, and generate a recommendation rating accordingly.

In some embodiments, the system can assign a recommendation rating with a value that is proportional to the trust rating. For example, if the recommender source has a very high trust rating, the system assigns a recommendation value that is higher than a default recommendation rating value.

In some embodiments, the system analyzes a history of past recommendations made by the recommender source, either to the recipient of the recommended content or to other user sources, to generate a value for the recommendation rating. For example, the system can average recommendation ratings by the recommender source for a plurality of previous recommendations made by the recommender source for the topic. In another example, the system also analyzes a history of treatment of the previous recommendations from the recommender source. For instance, the system determines whether the recipient of the recommended content, or other user sources linked to the recipient, has previously approved of, or indicated a preference for, past recommendations made by the recommender source for the topic. In another example, the system analyzes the other user sources linked to the recipient (e.g., other use sources that are members of the recipient's trust network) who may have also recommended the content and provided a content rating or who may have indicated approval of the recommended content. Based on that analysis, the system can assign a recommendation rating to the content. The system can limit the analysis to only those of the other user sources that the recipient user source trusts as highly as the recommender source (e.g., only select those of the other user sources linked to the recipient within the trust network that have trust rating that are greater than or substantially equal to the trust rating for the recommender source).

In some embodiments, subsequent to generating the recommendation rating, the system performs a computation of the recommendation rating with the trust rating, and calculates a score for the content recommendation in response to the computation of the recommendation rating with the trust rating.

Automatically Modifying Trust Ratings.

In some embodiments, the system automatically modifies a trust rating assigned to an entity based on various factors. For instance, the system can detect activity, such as user input provided by a first entity (e.g., a recipient entity of a content recommendation) via a user interface or some other activity that indicates an opinion regarding content recommended by a second entity (e.g., a recommender entity that recommends content). The user activity may indicate approval of the content recommendation by the recipient entity. For example, the system can detect that the recipient entity has accessed the content (e.g., clicked on, selected, viewed, listed to, etc.), and, in response, the system ascribes approval by the recipient entity merely because the recipient entity accessed the content. In another example, the system detects a direct indication of approval by the recipient entity, such as a selection of a "like" object regarding the content recommendation, an assignment of a favorable rating to the content recommendation, detecting a purchase of content associated with the content recommendation, etc. Based on the direct indication of approval, the system determines that the recommender entity is more trustworthy and, as a result, automatically increases the trust rating to an appropriate degree. The more often the recipient entity approves of content recommended by the recommender entity, the more the system can automatically increase the trust rating. Further, the more often the recipient entity disapproves of content recommended by the recommender entity, the more the system can automatically decrease the trust rating.

In another example, the system detects a degree of social networking interaction between the first entity and the second entity related to the content recommendation. Based on the degree of social networking interaction, the system automatically modifies a trust rating. For example, the system detects a degree of social network comments shared between the first entity and the second entity regarding the content recommendation. The degree of comments indicate a shared experience between the two entities regarding the content regardless of whether the entities agreed on a value of the recommended content. The system, therefore, may ascribe an increase in trust between the entities and, therefore, increase a trust rating. The system can notify a user prior to increasing a trust rating so that the user can verify whether the trust rating should be increased. In some embodiments, the system can analyze a context of language in the comments to ascertain whether the comments were of a positive or negative nature. In another example, the system can review a rating given by one or both of the recipients to one or more of the comments and use the rating as an indicator of whether the recommender source should be trusted more or less. Consequently, the system can automatically adjust the trust rating to be either higher or lower depending on whether the system ascertains that the social interaction was positive or negative. In another example, the system detects an amount of time spent playing a game that is, or that features, the recommended content. The system increases a degree of trust between the entities because of their shared experience.

In another example, the system detects that the recipient entity re-recommends the content that was recommended by the recommender. For instance, the recipient entity may forward the content recommendation to a member of their trust network or the recipient entity may assign the content recommendation to a bundle or channel. Based on the recipient entities re-recommending of the recommended content, the system increases the trust rating assigned to the recommender entity by the recipient entity. Further, if the recipient entity does not re-recommend the content, but instead expresses disapproval for the content (e.g., does not access the content, assigns a low/unfavorable content rating to the content, sends the content recommendation to a trash bin, etc.), the system can lower the trust rating assigned to the recommender entity. The system can modify the trust rating based on each recommendation or based on an aggregate of recommendations (e.g., periodically the system analyzes how the recipient entity treated content recommendations recommended by the recommender entity and, if the treatment was unfavorable or favorable on average, the system then increases or decreases the trust rating automatically).

In some embodiments, the system can increase a trust rating based on a duration of time that the recommender source has been assigned the trust rating. The longer an entity holds the trust rating can indicate that the entity is more worthy of trust, and, thus, the system can automatically increase the trust rating. The system can take into consideration an initial trust level and, based on the initial trust level, either increase or decrease the trust rating over time. For example, using a trust scale of values between "1" to "10," if the first entity initially assigns trust above a pre-determined upper level (e.g., an initial trust level above "7"), then the system can increase trust over time. If the initial trust rating is initially assigned lower than a pre-determined lower level (e.g., an initial trust level below "3"), the system can decrease trust over time. The system can also honor limits on automatic increases or decreases of trust. For example, a user may specify that trust cannot automatically increase or decrease beyond a certain percentage (e.g., not more than plus or minus two trust rating values) without direct user approval.

In some embodiments, the system automatically increases trust based on trends. For example, if a recommender source has recently recommended a large amount of favorable content, the system can automatically increase the trust rating for the recommender source accordingly. The automatic increase can also expire if the trend does not continue.

In some embodiments, the system can automatically increase trust values based on an amount of other trust ratings assigned to the recommender entity for the topic by other entities in the recipient entity's trust network. For example, if many entities trust the recommender entity higher for the topic, but the recipient entity has assigned a lower trust rating to that entity for a topic, the system can automatically adjust the trust rating higher, or at least suggest a higher trust rating for that recommender entity. The system may refrain from automatically adjusting the trust rating for the recommender entity unless the other entities in the recipient entity's trust network have relatively high trust ratings. For instance, if a group of entities that are rated a "9" out of "10" for trust on a topic within the recipient entity's trust network, and if that group of entities have rated the recommender entity above a "9" for trust on the topic, then the system automatically increases, or suggests an increase, of the recipient entity's trust rating for the recommender entity. Likewise, if the group of entities that are rated a "9" out of "10" for trust on the topic rate the recommender entity below a specific value (e.g., all of the group of entities rate the recommender source at a "2" or below), then the system automatically decreases, or suggests a decrease, of the recipient entity's trust rating for the recommender entity.

In all examples where the system automatically modifies the trust ratings, the system can instead, or in addition, suggest a proposed degree of modification to the trust rating. The system can generate the proposed degree of modification to the trust rating in response to detection of an activity, user input, opinion, etc. associated with the content recommendation (e.g., compute the proposed degree of modification to the trust rating based on a degree of approval or disapproval of the content recommendation, compute the proposed degree of modification based on a degree of difference between the recommendation rating and a different rating assigned by the recipient entity to the recommended content, and so forth). The system can present the proposed degree of modification to the trust rating via a user interface associated with the recipient entity (e.g., for approval, rejection, or modification by the recipient entity's user input via the user interface).

In some embodiments, the system can utilize tokens, or persistent objects, that can multiply trust when an entity is in possession of the token for a particular topic. For example, the recipient entity may give a trusted user a token that represents a high degree of preference for a particular topic above other users. Before generating a score for recommended content the system may detect whether the recommender source has been given a token and, based on the possession of the token, the system automatically increases the trust rating for the topic. In some embodiments the token includes metadata that indicates a preference value by the user source and the system reads from the metadata. In other examples, the token assigns metadata to the recommended content such that when read indicates an increase factor for the trust rating. In yet other example, the token can assign a trust rating to the content using an encryption key. The token can be set to expire after a given amount of time or after a specific event(s) (e.g., if the user consistently provides non-favorable content).

Visually representing scored content. In some embodiments, the system determines a location within a user interface on which to place a reference for the content recommendation based on the score for the content recommendation. As described previously, some locations refer to a position of a reference to the content recommendation within a ranked list. Other embodiments include a position of the references in relation to coordinates, borders, etc. For example, the system can cause highly rated content to move to a left side of a display. In another example, the system modifies characteristics of the references based on the assigned score. For example, highly scored content may have larger font or font of a different color. Highly scored content may have a sparkle effect, or another type of animation, sprite effect, etc., to highlight the content above other content that did not score as highly. Scored content can be represented in a variety of ways including in a visual map instead of, or in addition to, a ranked list. The system can include scored content into three-dimensional simulated environments, such virtual universes, massively multiplayer online games (MMO), etc. Avatars in a virtual universe can be assigned trust ratings and can make content recommendations within the virtual universe. References to scored content can appear within a virtual universe environment according to their scores (e.g., as advertisements, on a dashboard, within a region or area of etc.). Scored content can be presented via smartphone applications and web widgets, as tag clouds on a webpage, and so forth.

Several embodiments of the invention have thus been described. However, those ordinarily skilled in the art will recognize that the invention is not limited to the embodiments described, but can be practiced with modification and alteration within the spirit and scope of the appended claims that follow.

What is claimed:

1. A system comprising:
   one or more processors; and
   one or more modules configured to store instructions, which when executed by at least one of the one or more processors, cause the system to perform operations to:
   detect a recommendation, by a recommendation source to a receiver of the recommendation, of digital content hosted by a digital content host, wherein the digital content host is distinct from the recommendation source and the recommendation of the digital content is associated with a topic,
   detect a first value that relates the recommendation source to the receiver of the recommendation specifically for prior recommendations of digital content, from a plurality of digital content hosts, that is associated with the topic, and
   calculate a second value associated with the digital content based on the first value.

2. The system of claim 1, wherein the operation to calculate the second value includes an operation to compute the first value with a third value that represents degree of one or more of recommendation of, preference for, dislike of, knowledge of, use of, and interaction with the digital content by the source and wherein the third value is one or more of implied and non-implied.

3. The system of claim 1, wherein the one or more modules are configured to store instructions, which when executed by at least one of the one or more processors, cause the system to further perform an operation to assign the first value based on one or more of a default value to assign to recommendations for the topic when the recommendations for the topic have not been assigned a rating that indicates a degree of recommendation, a value proportional to the first value, an average rating by the source for previously recommended digital content on the topic, a value equivalent to ratings associated with a network address from which the recommendation originates, a value based on a degree of preference for additional digital content on the topic previously recommended by the source, and rating for the digital content provided by an additional source with a trust rating that is greater than or equal to the first value.

4. The system of claim 1, wherein the one or more modules are configured to store instructions, which when executed by at least one of the one or more processors, cause the system to further perform an operation to determine a location within a user interface on which to place a reference for the digital content based on one or more of first value, the second value, and a third value that indicates a relationship between the source and the digital content.

5. The system of claim 1, wherein the first value is assigned to the source based on information from one or more user accounts socially interrelated with the source within a social network, wherein the receiver of the recommendation is one of the one or more user accounts.

6. The system of claim 5, wherein the one or more modules are configured to store instructions, which when executed by at least one of the one or more processors, cause the system to further perform an operation modify the first value based on one or more of an indication of approval of the digital content by at least one of one or more user accounts, an additional recommendation of the digital content by the receiver of the recommendation to an additional one of the one or more user accounts, a duration of time that the first value has been assigned to the source, an amount of trust ratings assigned to the source for the topic by the one or more user accounts, and a degree of social networking interaction between the source and the one or more user accounts.

7. The system of claim 1, wherein the one or more modules are configured to store instructions, which when executed by at least one of the one or more processors, cause the system to further perform operations to:
    detect an indication of opinion by the receiver of the recommendation regarding the digital content,
    generate a proposed degree of modification to the first value in response to detection of the indication of opinion, and
    provide, for presentation via a user interface associated with the receiver of the recommendation, the proposed degree of modification.

8. The system of claim 1, wherein the one or more modules are configured to store instructions, which when executed by at least one of the one or more processors, cause the system to further perform operations to:
    detect possession by the source of a token that originated from the receiver of the recommendation, wherein the token indicates a third value that specifies a preference by the receiver for one or more of the source and the topic, and
    one or more of calculate the second value based on the first value and the third value and modify the first value according to the third value.

9. A computer-implemented method, comprising:
    detecting a recommendation to digital content, wherein the digital content is hosted by a digital content host and the digital content host is not a source of the recommendation;
    detecting a rating associated, via a user account, with the source of the recommendation;
    detecting via one or more processors, user input regarding one or more of the digital content and the recommendation, wherein the user input is associated with the user account, and
    modifying, via at least one of the one or more processors, the rating associated with the source based on the user input.

10. The computer-implemented method of claim 9, wherein the detecting the user input regarding the one or more of the digital content and the recommendation comprises detecting one or more of an indication of approval of the one or more of the digital content and the recommendation via the user account, an indication of disapproval of the one or more of the digital content and the recommendation via the user account, an assignment of a digital content rating via the user account, a forwarding of the recommendation via the user account and detecting a purchase associated with the digital content via the user account.

11. The computer-implemented method of claim 9, wherein the modifying the rating associated with the source based on the user input comprises:
    computing a degree of modification to make to the rating based on a value associated with the user input; and
    modifying the rating according to the degree of modification.

12. The computer-implemented method of claim 11, wherein the value associated with the user input is associated with one or more of a degree of approval of the one or more of the digital content and the recommendation via the user account, a degree of disapproval of the one or more of the digital content and the recommendation via the user account, a degree of difference between a first content rating made by the source of the recommendation and a second digital content rating made via the user account, a degree of forwarding of the recommendation via the user account, an amount of a purchase associated with the digital content via the user account, and a degree of social networking interaction between the source of the recommendation and the user account concerning the one or more of the recommendation and the digital content.

13. The computer-implemented method of claim 9 further comprising:
    determining a digital content rating;
    performing a computation of the digital content rating and the rating associated with the source;
    calculating a score for the one or more of the digital content and the recommendation in response to the performing the computation and,
    providing the score to use for presentation of one or more of the digital content and the recommendation.

14. The computer-implemented method of claim 13 wherein the determining the digital content rating comprises one or more of:
    receiving the digital content rating with the recommendation to the digital content, wherein the digital content rating is a representation of a degree of preference for the digital content by the source of the recommendation; and
    generating the digital content rating subsequent to receiving the recommendation wherein the digital content rating represents an implied degree of preference that the source has for the digital content.

15. A system comprising:
    one or more processors; and
    one or more modules configured to store instructions, which when executed by at least one of the one or more processors, cause the system to perform operations to:
    detect a recommendation, by a recommendation source to a receiver of the recommendation, of digital content hosted by a digital content host, wherein the recommendation source is distinct from the digital content host and the recommendation of the digital content is associated with a topic,
    detect a first value that relates the recommendation source to the receiver of the recommendation specifically for prior recommendations of digital content, from a plurality of digital content hosts, that is associated with the topic, and,
    calculate a second value associated with the digital content based on the first value.

* * * * *